United States Patent
Shahbazi Mirzahasanloo et al.

(10) Patent No.: US 12,236,959 B2
(45) Date of Patent: Feb. 25, 2025

(54) AUDIO ENCODING BASED ON LINK DATA

(71) Applicant: QUALCOMM Incorporated, San Diego, CA (US)

(72) Inventors: Taher Shahbazi Mirzahasanloo, San Diego, CA (US); Joel Linsky, San Diego, CA (US); Ferdinando Olivieri, San Diego, CA (US); Mayank Batra, Cambridge (GB)

(73) Assignee: QUALCOMM Incorporated, San Diego, CA (US)

(*) Notice: Subject to any disclaimer, the term of this patent is extended or adjusted under 35 U.S.C. 154(b) by 205 days.

(21) Appl. No.: 17/332,831

(22) Filed: May 27, 2021

(65) Prior Publication Data

US 2022/0383881 A1   Dec. 1, 2022

(51) Int. Cl.
*G10L 19/005* (2013.01)
*G10L 19/008* (2013.01)

(52) U.S. Cl.
CPC .................. *G10L 19/005* (2013.01)

(58) Field of Classification Search
CPC ........ G10L 19/005; G10L 15/00; G10L 15/22
See application file for complete search history.

(56) References Cited

U.S. PATENT DOCUMENTS

| | | | | |
|---|---|---|---|---|
| 9,984,693 B2* | 5/2018 | Kim | ...................... | G10L 19/008 |
| 11,533,531 B1* | 12/2022 | Link | .................. | H04N 21/4302 |
| 2012/0323568 A1* | 12/2012 | Bruhn | ................... | H04L 65/762 |
| | | | | 704/201 |
| 2016/0007132 A1* | 1/2016 | Peters | ...................... | H04R 5/04 |
| | | | | 381/17 |
| 2018/0091919 A1* | 3/2018 | Chon | ....................... | H04S 7/303 |
| 2018/0124540 A1* | 5/2018 | Skoglund | ................ | H04S 7/302 |
| 2019/0198028 A1* | 6/2019 | Kim | ...................... | G10L 19/167 |
| 2019/0385622 A1* | 12/2019 | Kim | ...................... | G10L 19/167 |
| 2020/0075032 A1* | 3/2020 | Joseph | .................. | G10L 19/002 |
| 2020/0252162 A1* | 8/2020 | Denboer | ................... | H04L 1/08 |

(Continued)

FOREIGN PATENT DOCUMENTS

| CN | 105229734 A | * | 1/2016 | ........... G10L 19/008 |
|---|---|---|---|---|
| EP | 1176750 A1 | | 1/2002 | |

(Continued)

OTHER PUBLICATIONS

E. Tanghe et al., "Range of an IEEE 802.11b/g system in industrial environments based on site survey measurements and propagation models," 2008 IEEE Antennas and Propagation Society International Symposium, San Diego, CA, USA, 2008, pp. 1-4, doi: 10.1109/APS.2008.4619010. (Year: 2008).*

(Continued)

*Primary Examiner* — Jialong He
(74) *Attorney, Agent, or Firm* — QUALCOMM Incorporated; Espartaco Diaz Hidalgo

(57) ABSTRACT

A device includes a memory configured to store instructions and one or more processors configured to execute the instructions. The one or more processors are configured to execute the instructions to obtain link data corresponding to a communication link to a second device. The one or more processors are configured to execute the instructions to select, at least partially based on the link data, between an ambisonics mode and a stereo mode.

30 Claims, 16 Drawing Sheets

(56) References Cited

U.S. PATENT DOCUMENTS

2020/0260298 A1* 8/2020 Haartsen ............... H04W 76/16
2020/0293268 A1* 9/2020 Beard .................... G06F 3/165

FOREIGN PATENT DOCUMENTS

| EP | 3591909 A1 | 1/2020 | | |
|----|------------|--------|---|---|
| WO | 2016057926 A1 | 4/2016 | | |
| WO | WO-2021122076 A1 * | 6/2021 | ............. | G06F 3/048 |

OTHER PUBLICATIONS

Suhaib A. Obeidat, Abraham N. Aldaco, Violet R. Syrotiuk, Cross-layer opportunistic adaptation for voice over ad hoc networks, Computer Networks, vol. 56, Issue 2, 2012, pp. 762-779, ISSN 1389-1286, https://doi.org/10.1016/j.comnet.2011.11.002. (Year: 2011).*
International Search Report and Written Opinion—PCT/US2022/072565—ISA/EPO—Dec. 15, 2022.
Partial International Search Report—PCT/US2022/072565—ISA/EPO—Sep. 12, 2022.

* cited by examiner

AUDIO ENCODING BASED ON LINK DATA

I. FIELD

The present disclosure is generally related to encoding audio data.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

One application of such devices includes providing wireless immersive audio to a user. As an example, a headphone device worn by a user can receive streaming audio data from a remote server for playback to the user. To illustrate, the headphone device detects a rotation of the user's head and transmits head tracking information to the remote server. The remote server updates an audio scene based on the head tracking information, generates binaural audio data based on the updated audio scene, and transmits the binaural audio data to the headphone device for playback to the user.

Performing audio scene updates and binauralization at the remote server enables the user to experience an immersive audio experience via a headphone device that has relatively limited processing resources. However, due to latencies associated with transmitting information such as head motion data between the headphone device and the remote server, updating the audio data at the remote server based on the received information, and transmitting the updated binaural audio data to the headphone device, such a system can result in an unnaturally high latency. To illustrate, the time delay between the rotation of the user's head and the corresponding modified spatial audio being played out at the user's ears can be unnaturally long, which may diminish the user's experience.

Although latency may be reduced by transmitting the audio scene data to the headphone device and performing adjustments to the audio scene at the headphone device, the amount of audio data that can be transferred between the audio source and the headphone device can be limited by the quality of the communication link between the audio source and the headphone device. However, the quality of the communication link can fluctuate during a communication session. Fluctuations in the quality of the communication link can cause additional delays and playback interruptions at the headphone device when the amount of audio data being transmitted exceeds the capacity of the communication link.

III. SUMMARY

According to a particular implementation of the techniques disclosed herein, a device includes a memory configured to store instructions and one or more processors configured to execute the instructions. The one or more processors are configured to execute the instructions to obtain link data corresponding to a communication link to a second device. The one or more processors are configured to execute the instructions to select, at least partially based on the link data, between an ambisonics mode and a stereo mode.

According to another particular implementation of the techniques disclosed herein, a method includes obtaining, at one or more processors, link data corresponding to a communication link to a second device. The method also includes selecting, at the one or more processors and at least partially based on the link data, between an ambisonics mode and a stereo mode.

According to another particular implementation of the techniques disclosed herein, a non-transitory computer-readable medium includes instructions that, when executed by one or more processors, cause the one or more processors to obtain link data corresponding to a communication link to a second device. The instructions, when executed by the one or more processors, also cause the one or more processors to select, at least partially based on the link data, between an ambisonics mode and a stereo mode.

According to another particular implementation of the techniques disclosed herein, an apparatus includes means for obtaining link data corresponding to a communication link to a second device. The apparatus also includes means for selecting, at least partially based on the link data, between an ambisonics mode and a stereo mode.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
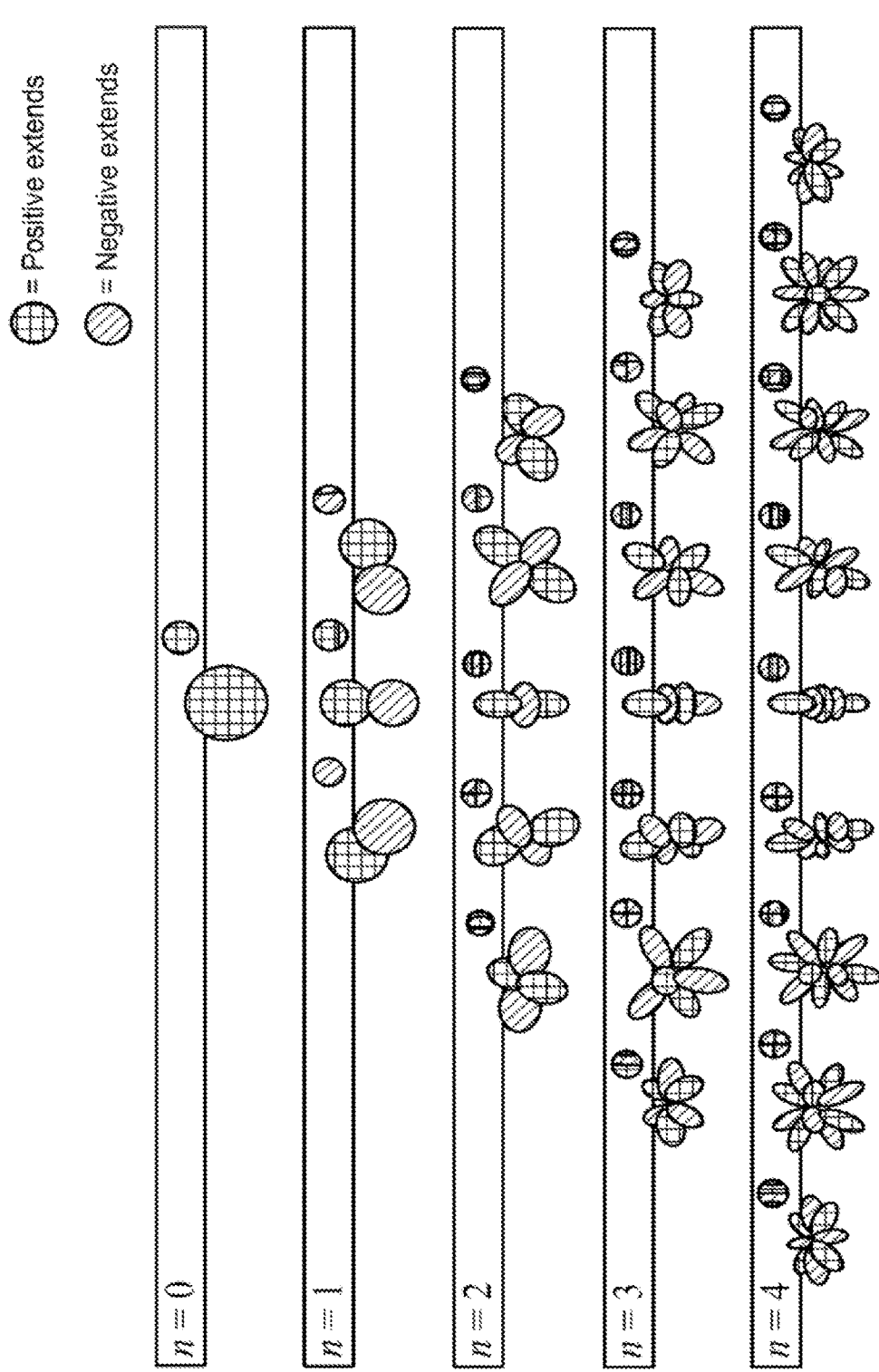
FIG. 1 is a diagram illustrating spherical harmonic basis functions of various orders and sub-orders.

Systems and methods for performing audio encoding are described in which encoding techniques are dynamically adapted based on link data corresponding to a communication link between two devices. In conventional systems, latencies associated with a headphone device transmitting head tracking information to a remote server, updating audio data based on the head tracking information at the remote server, and transmitting updated binaural audio data to the headphone device can result in an unnaturally high motion-to-sound latency and may diminish a user experience. Although latency may be reduced by transmitting the audio scene data to the headphone device and performing adjustments to the audio scene at the headphone device, the amount of audio data that can be transferred between the audio source and the headphone device can be limited by the quality of the communication link between the audio source and the headphone device, which can fluctuate during a communication session. Fluctuations in the quality of the communication link can cause additional delays and playback interruptions at the headphone device when the amount of audio data being transmitted exceeds the capacity of the communication link. By dynamically adapting audio encoding based on the link data, an amount of audio data being transmitted can be adjusted based on the current condition of the communication link to substantially optimize audio playback quality while reducing or eliminating delays and interruptions due to exceeding the capacity of the communications link.

In some examples, a first device, such as a phone, computer, or server, receives link data from a second device, such as a headset device. The link data can include data that is measured at the second device, such as a received signal strength indicator (RSSI) or a transmit power indicator, that enables the first device to estimate a quality of a communication link between the first device and the second device. The first device can dynamically select an audio encoding mode based on the estimated link quality, selecting a higher-resolution encoding mode, such as ambisonics, when the communication link is capable of carrying a larger amount of data to the second device, or selecting a lower-resolution encoding mode that uses less data, such as a stereo mode or a mono mode, when the communication link has reduced capacity.

According to some aspects, link data is conveyed via the communication link and forwarded by a controller directly to an audio sub-system or codec for reduced latency as compared to forwarding such data to an application processor of the receiving device. In some aspects, metadata that is associated with encoded audio data can be transmitted in a same audio packet as the encoded audio data and directly forwarded along with the encoded audio data to an audio sub-system or codec.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

In general, techniques are described for coding of three dimensional (3D) sound data, such as ambisonics audio data. Ambisonics audio data may include different orders of ambisonic coefficients, e.g., first order or second order and more (which may be referred to as higher-order ambisonics (HOA) coefficients corresponding to a spherical harmonic basis function having an order greater than one). Ambisonics audio data may also include mixed order ambisonics (MOA). Thus, ambisonics audio data may include at least one ambisonic coefficient corresponding to a harmonic basis function.

The evolution of surround sound has made available many audio output formats for entertainment. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, and various formats that includes height speakers such as the 7.1.4 format and the 22.2 format (e.g., for use with the Ultra High Definition Television standard). Non-consumer formats can span any number of speakers (e.g., in symmetric and non-symmetric geometries) often termed 'surround arrays'. One example of such a sound array includes 32 loudspeakers positioned at coordinates on the corners of a truncated icosahedron.

The input to a future Moving Picture Experts Group (MPEG) encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); or (iii) scene-based audio, which involves representing the sound field using coefficients of spherical harmonic basis functions (also called "spherical harmonic coefficients" or SHC, "Higher-order Ambisonics" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w13411.zip.

There are various 'surround-sound' channel-based formats currently available. The formats range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce a soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $A_n^m(k)$. Here, $$k = \frac{\omega}{c},$$

c is me speed or sound (~343 m/s), $\{r_r, \theta_r, \varphi_r\}$ is a point of reference (or observation point), $j_n(\bullet)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

FIG. 1 is a diagram 100 illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes. A number of spherical harmonic basis functions for a particular order may be determined as: # basis functions=(n+1)^2. For example, a tenth order (n=10) would correspond to 121 spherical harmonic basis functions (e.g., (10+1)^2).

The SHC $A_n^m(k)$ can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(4+1)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the sound field corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy $g(\omega)$ as a function of frequency (e.g., using time-frequency analysis techniques, such as performing a fast Fourier transform on the PCM stream) enables conversion of each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$.

Figure 2:
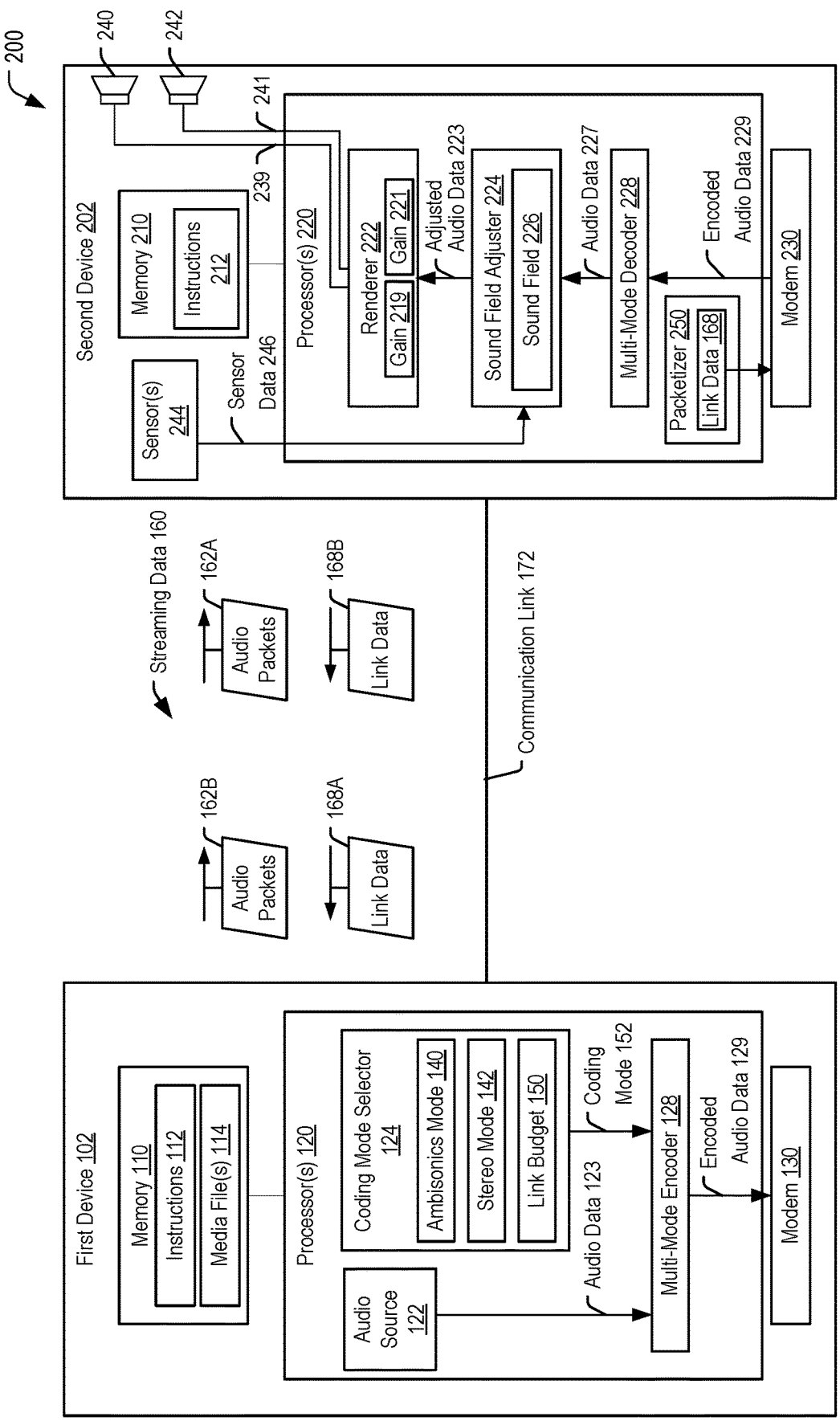
FIG. 2 is a block diagram illustrating an example of an implementation of a system for audio encoding based on link data, in accordance with some examples of the present disclosure.

Referring to FIG. 2, a system 200 includes a first device 102 coupled to a second device 202 via a communication link 172. The communication link 172 may include one or more of a fifth generation (5G) cellular digital network, a Bluetooth® (a registered trademark of BLUETOOTH SIG, INC., Washington) network, an Institute of Electrical and Electronic Engineers (IEEE) 802.11-type network (e.g., Wi-Fi), one or more other wireless networks, or any combination thereof. The first device 102 is configured to generate, based on link data 168 received from the second device 202, encoded audio data 129 that represents audio data 123 from an audio source 122. The encoded audio data 129 is encoded using a coding mode 152 that is dynamically adjusted based on a condition of the communication link 172. The second device 202 is configured to receive encoded audio data via the communication link 172, decode the received audio data, adjust the decoded audio data based on movement of the second device 202, and play out the resulting audio, reducing latency associated with transmitting movement information from the second device 202 to the first device 102 for motion-based adjustment of the audio data at the first device 102.

The first device 102 includes a memory 110, one or more processors 120, and a modem 130 that is configured to enable communication to the second device 202 via the communication link 172. The memory 110 includes instructions 112 that are executable by the one or more processors 120. The memory 110 also includes one or more media files 114. The one or more media files 114 are accessible to the one or more processors 120 as a source of sound information, as described further below. In some examples, the one or more processors 120 are integrated in a portable electronic device, such as a smartphone, tablet computer, laptop computer, or other electronic device. In other examples, the one or more processors 120 are integrated in a server, such as an edge server.

The one or more processors 120 are configured to execute the instructions 112 to perform operations associated with audio processing. To illustrate, the one or more processors 120 are configured to receive the audio data 123 from the audio source 122. For example, the audio source 122 may correspond to a portion of one or more of the media files 114, a game engine, one or more other sources of sound information, such as audio data captured by one or more microphones integrated in or coupled to the first device 102, or a combination thereof. In an example, the audio data 123 includes ambisonics data and corresponds to at least one of two-dimensional (2D) audio data that represents a 2D sound field or three-dimensional (3D) audio data that represents a 3D sound field. In another example, the audio data 123 includes audio data in a traditional channel-based audio channel format, such as 5.1 surround sound format. In another example, the audio data 123 includes audio data in an object-based format.

The one or more processors 120 are configured to obtain the link data 168 corresponding to the communication link 172 to the second device 202. The link data 168 can include or correspond to link information measured by the second device 202, such as a received power level of transmissions received from the first device 102 via the communication link 172, information regarding a power level used by the second device 202 to send transmissions to the first device 102 via the communication link 172, information corresponding to an estimated distance between the first device 102 and the second device 202, or a combination thereof, such as described in further detail with reference to FIG. 3.

The one or more processors 120 are configured to select a coding mode 152 associated with the audio data 123 via operation of a coding mode selector 124. For example, the coding mode selector 124 is configured to select, at least partially based on the link data 168, between an ambisonics mode 140 and a stereo mode 142. To illustrate, when the link data 168 indicates the communication link 172 is relatively strong and therefore can carry a relatively large amount of audio data, the coding mode selector 124 selects the ambisonics mode 140, which uses more bits to encode a frame of audio data than the stereo mode 142, to provide higher-quality audio (e.g., four or more channels representing 3D sound) to the second device 202. When the link data 168 indicates the communication link 172 is relatively weak and can carry a relatively small amount of audio data, the coding mode selector 124 selects the stereo mode 142, which uses fewer bits per frame than the ambisonics mode 140 and may provide lower-quality audio (e.g., two audio channels) to the second device 202. In a particular implementation, the coding mode selector 124 is configured to determine a link budget 150 and to select the coding mode 152 based on a comparison of the link budget 150 to one or more thresholds, such as described in further detail with reference to FIG. 3. The coding mode selector 124 is configured to output an indication of the coding mode 152 to a multi-mode encoder 128.

The multi-mode encoder 128 is configured to encode audio data (e.g., the audio data 123) according to the selected ambisonics mode 140 or stereo mode 142 to generate encoded audio data 129. The encoded audio data 129 is output by the one or more processors 120 to the modem 130 to send the encoded audio data 129 to the second device 202. For example, the audio data 123 may be encoded and transmitted as streaming data 160 including a sequence of media packets, illustrated as audio packets 162 including one or more first audio packets 162A and one or more second audio packets 162B that sequentially follow the one or more first audio packets 162A in the streaming data 160. In some implementations, the audio source 122 corresponds to a portion of a media file (e.g., a portion of the one or more media files 114), and the streaming data 160 is associated with a virtual reality experience that is streamed to the second device 202 (e.g., a playback device) via at least one of a 5G cellular digital network or a Bluetooth® network.

In some implementations, the one or more processors 120 receive a first set of link data, illustrated as link data 168A, from the second device 202 and determines the coding mode 152 for encoding a first portion of the audio data 123 (e.g., one or more frames of the audio data 123) for transmission to the second device 202 via the one or more first audio packets 162A. The one or more processors 120 are also configured to receive a second set of link data, illustrated as link data 168B, subsequent to receiving the link data 168A, and may update the coding mode 152 to account for changes in the communication link 172. For example, the coding mode selector 124 can determine, based on the link data 168B indicating reduced link strength as compared to the link data 168A, to switch from the ambisonics mode 140 used for encoding the first audio packets 162A to the stereo mode 142 to encode a next portion of the audio data 123. Thus, the first device 102 can receive a stream of communication link information indicating changes in the quality of the communication link 172 and update the encoding of streaming audio data accordingly.

In some implementations, such as described in further detail with reference to FIG. 3, the multi-mode encoder 128 is dynamically configured, based on the coding mode 152, to encode data according to one of various ambisonics modes, the stereo mode 142, one or more other types of modes, such as a mono mode, or any combination thereof. Examples of dynamic switching between coding modes is described in further detail with reference to FIG. 4A and FIG. 4B. In some implementations, the multi-mode encoder 128 is also configured to manage targeted encoding specifications by adjusting encoding factors based on the link budget 150, such as target quality, bitrate, etc., as described in further detail with reference to FIG. 5A and FIG. 5B.

The second device 202 includes one or more processors 220 coupled to a memory 210, a modem 230, one or more sensors 244, a first loudspeaker 240, and a second loudspeaker 242. In an illustrative example, the second device 202 corresponds to a wearable device. To illustrate, the one or more processors 220, the memory 210, the modem 230, the one or more sensors 244, and the loudspeakers 240, 242 may be integrated in a headphone device in which the first loudspeaker 240 is configured to be positioned proximate to a first ear of a user while the headphone device is worn by the user, and the second loudspeaker 242 is configured to be positioned proximate to a second ear of the user while the headphone device is worn by the user.

The memory 210 is configured to store instructions 212 that are executable by the one or more processors 220. The one or more sensors 244 are configured to generate sensor data 246 indicative of a movement of the second device 202, a pose of the second device 202, or a combination thereof. As used herein, the "pose" of the second device 202 indicates a location and an orientation of the second device 202. The one or more sensors 244 include one or more inertial sensors such as accelerometers, gyroscopes, compasses, positioning sensors (e.g., a global positioning system (GPS) receiver), magnetometers, inclinometers, optical sensors, one or more other sensors to detect acceleration, location, velocity, acceleration, angular orientation, angular velocity, angular acceleration, or any combination thereof, of the second device 202. In one example, the one or more sensors 244 include GPS, electronic maps, and electronic compasses that use inertial and magnetic sensor technology to determine direction, such as a 3-axis magnetometer to measure the Earth's geomagnetic field and a 3-axis accelerometer to provide, based on a direction of gravitational pull, a horizontality reference to the Earth's magnetic field vector. In some examples, the one or more sensors 244 include one or more optical sensors (e.g., cameras) to track movement, individually or in conjunction with one or more other sensors (e.g., inertial sensors).

The modem 230 is configured to receive the encoded audio data 129 from the first device 102 via the communication link 172 and to output corresponding encoded audio data 229 to the one or more processors 220. In some implementations, the encoded audio data 229 matches the encoded audio data 129, while in other implementations the encoded audio data 229 may differ from the encoded audio data 129 due to one or more audio packets being lost during transmission, one or more bit errors occurring in a received audio packet, or one or more other causes of data loss. Any such data losses may be corrected (e.g., via forward error correction encoding or redundant information transmission) or may be compensated for (e.g., via interpolation between received packets to estimate audio data for a lost packet).

The one or more processors 220 are configured to continually, periodically, or occasionally measure information associated with the communication link 172 to generate the link data 168. A packetizer 250 is configured to embed the link data 168 into one or more packets to send to the first device 102 via the communication link 172, such as described further with reference to FIGS. 7A-7D.

The one or more processors 220 are configured to decompress the encoded audio data 229. For example, a multi-mode decoder 228 is configured to process the encoded audio data 229 to generate decompressed audio data 227 (also referred to as audio data 227). The decompressed audio data 227 corresponds to the audio data 123 at the first device 102 and may be indicative of a sound field 226. In some implementations, the decompressed audio data 227 includes ambisonics data and corresponds to at least one of two-dimensional (2D) audio data or three-dimensional (3D) audio data.

The one or more processors 220 are configured to adjust the decompressed audio data 227 to alter the sound field 226 based on data associated with at least one of a translation or an orientation associated with movement of the second device 202, such as indicated by the sensor data 246. To illustrate, a sound field adjuster 224 is configured to adjust the audio data 227 to alter the sound field 226 based on the sensor data 246 indicating a change in orientation or translation of the second device 202. In one example, the one or more processors 220 are configured to adjust the audio data 227 to rotate the sound field 226 responsive to the sensor data 246 indicating a change of the orientation. In one example, the one or more processors 120 at the first device 102 are configured to perform one of a translation or a rotation of a sound field associated with the audio data 123 based on motion data received from the second device 202, and the one or more processors 220 are configured to perform the other of the translation or the rotation of the sound field 226 based on the sensor data 246. For example, the one or more processors 120 may be configured to receive, from the second device 202, motion data corresponding to a translation, a rotation, or both, associated with movement of the second device 202 (e.g., movement of the wearer of the second device 202 implemented as a headphone device). As used herein, "movement" includes rotation (e.g., a change in orientation without a change in location, such as a change in roll, tilt, or yaw), translation (e.g., non-rotation movement), or a combination thereof. Illustrative examples of mechanisms to adjust a sound field based on motion data are described in further detail with reference to FIGS. 6A and 6B.

The one or more processors 220 include a renderer 222 configured to render the adjusted decompressed audio data 223 into two or more loudspeaker gains to drive two or more loudspeakers. For example, a first loudspeaker gain 219 is generated to drive the first loudspeaker 240 and a second loudspeaker gain 221 is generated to drive the second loudspeaker 242. To illustrate, the one or more processors 220 are configured to perform binauralization of the adjusted decompressed audio data 223, such as using one or more HRTFs or BRIRs to generate the loudspeaker gains 219, 221, and output the adjusted decompressed audio data as pose-adjusted binaural audio signals 239, 241 to the loudspeakers 240, 242 for playback.

In some implementations, the first device 102 and the second device 202 may each perform operations that, when combined, correspond to a split audio rendering operation in which the first device 102 processes the audio data 123 from the audio source 122 to generate audio data, such as 2D or 3D ambisonics data, representing a sound field. In some implementations, the first device 102 also performs translations to the sound field prior to sending the encoded audio data 129 to the second device 202. The second device 202 adjusts the audio data 227 to alter the sound field 226 based on the orientation of the second device 202 and renders the resulting adjusted audio data 223 for playout. In some implementations, the second device 202 also performs translations to the sound field 226.

Thus, the first device 102 may operate as a streaming source device and the second device 202 may operate as a streaming client device. By dynamically modifying the coding mode 152 based on the link data 168 generated at the second device 202 and transmitted to the first device 102, a quality and bitrate of the encoded audio data 129 can be adjusted responsive to changing conditions of the communication link 172. To illustrate, audio quality can be increased by sending a larger amount of audio data in response to detecting improved capacity of the communication link 172, and audio quality can be reduced by sending a smaller amount of audio data in response to detecting reduced capacity of the communication link 172. Interruptions or delays due to transmission errors of the audio packets 162 can be reduced or eliminated, improving a user experience during audio playout at the second device 202.

Although the second device 202 is described as a headphone device for purpose of explanation, in other implementations the second device 202 is implemented as another type of device. Although the first device 102 is illustrated as receiving the link data 168 and generating the encoded audio data 129, in other implementations the second device 202 also receives link data from the first device 102 and includes a coding mode selector and a multi-mode encoder configured to encode audio data at the second device (e.g., data captured by one or more microphones integrated in or coupled to the second device 202) based on a condition of the communication link 172 for transmission to the first device 102. Similarly, the first device 102 can include a multi-mode decoder, sound field adjuster, renderer, or a combination thereof, to process encoded audio data received from the second device 202.

Figure 3:
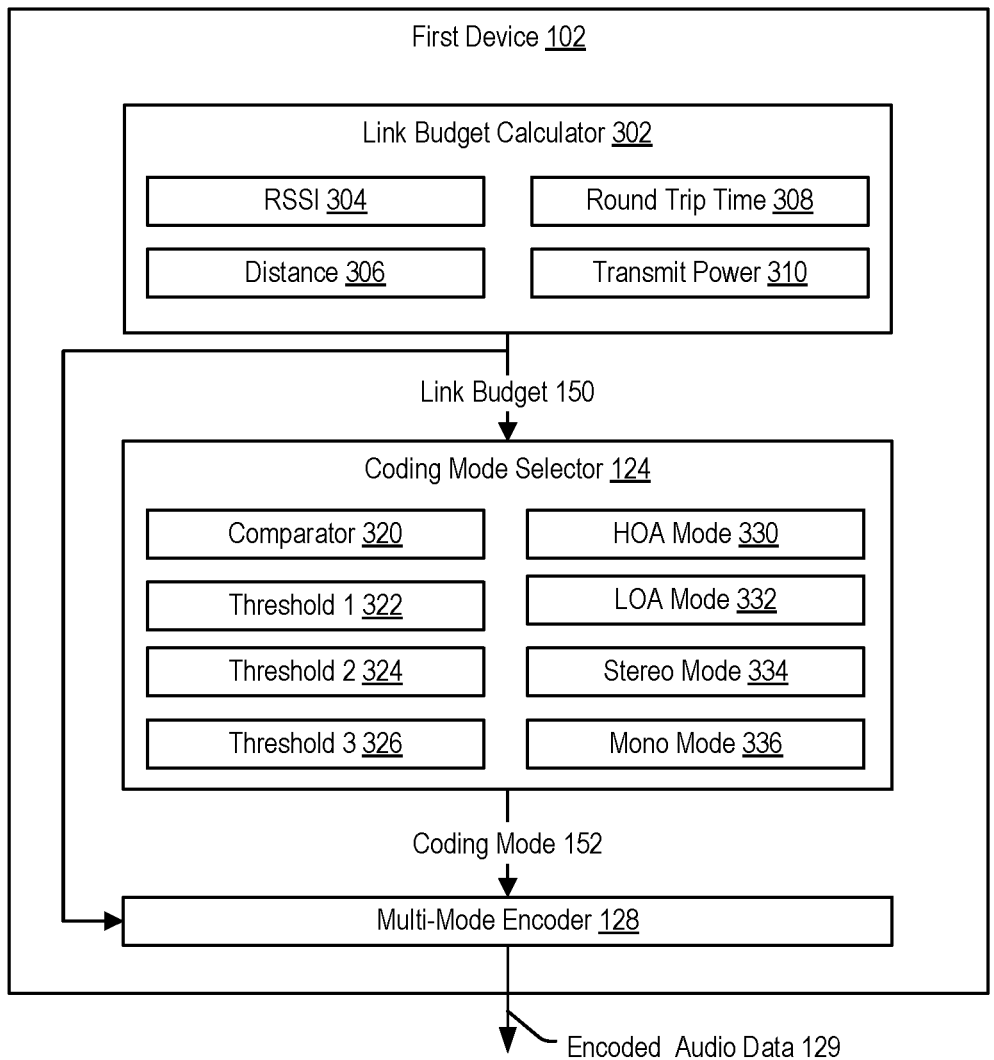
FIG. 3 is a block diagram illustrating an example of components of the first device of FIG. 2, in accordance with some examples of the present disclosure.

FIG. 3 illustrates an example of components of the first device 102 of FIG. 2, including a link budget calculator 302, the coding mode selector 124, and the multi-mode encoder 128, in accordance with a particular implementation. The link budget calculator 302 is configured to generate the link budget 150 based on the received link data 168 and, in some implementations, based on additional data regarding the communication link 172 of FIG. 2. For example, the link data 168 may include a received signal strength indication (RSSI) 304, an estimated distance 306 between the first device 102 and the second device 202, a round trip time 308 corresponding to transmissions between the first device 102 and the second device 202, a transmit power 310 corresponding to the second device 202, or any combination thereof.

In some implementations, the RSSI 304 is transmitted from the second device 202 to the first device 102 as a component of the link data 168. To illustrate, the RSSI 304 may be measured at the second device 202 and transmitted to the first device 102. The RSSI 304 can enable the first device 102 to determine the link budget 150 based on the difference between the transmission power used by the first device 102 and the corresponding received signal strength measured at the second device 202.

In some implementations, the distance 306 is provided by the second device 202 or is calculated based on data received from the second device 202, such as location data (e.g., Global Positioning System (GPS) information) provided as a component of the link data 168. In some implementations, the distance 306 is estimated based on a loss of signal strength or one or more other factors that are affected by distance along the communication link 172. The distance 306 may be estimated by the second device 202, by the first device 102, or a combination thereof.

In some implementations, the round trip time 308 is determined based on timing information associated with transmissions from the first device 102 to the second device 202 and corresponding responses from the second device 202 that are received at the first device 102. The round trip time 308 can be computed as the sum of an amount of time associated with transmission across the communication link 172, a latency associated with generating a response at the second device 202, and an amount of time associated with transmission of the response across the communication link 172 to the first device 102. The link budget 150 can be estimated at least partially based on the round trip time 308.

In some implementations, the transmit power 310 includes data associated with transmissions from the second device 202, such as an indication of transmitter output power, transmitter antenna gain, transmitter losses, or a combination thereof, of the second device 202 during transmission of the link data 168 or other data (e.g., test data) to the first device 102. Alternatively, or in addition, the transmit power 310 may include one or more other factors corresponding to power gain or loss associated with transmitting messages from the second device 202 to the first device 102 via the communication link 172. Upon receiving an indication of the transmit power 310, the first device 102 can compute the link budget 150 based on the transmit power 310 and the corresponding received signal strength detected at the first device 102.

The coding mode selector 124 is configured to select the coding mode 152 based on the link budget 150. In the implementation depicted in FIG. 3, the coding mode selector 124 is configured to select between four modes: a higher order ambisonics (HOA) or mode 330 (e.g., second order ambisonics or mixed order ambisonics, as non-limiting examples), a lower order ambisonics (LOA) mode 332 (e.g., first order ambisonics), a stereo mode 334, and a mono mode 336. In some implementations, the HOA mode 330, the LOA mode 332, or both, may correspond to the ambisonics mode 140, and the stereo mode 334 corresponds to the stereo mode 142 of FIG. 2. The mono mode 336 can correspond to a single channel encoding mode.

In a particular implementation, increases and decreases in the link budget 150 affect an amount of data that can be transmitted along the communication link 172, and the coding mode selector 124 uses a comparator 320 to compare the link budget 150 to one or more thresholds to determine an appropriate coding mode for the link budget 150. The one or more thresholds include a first threshold 322 that is larger than a second threshold 324, and the second threshold 324 is larger than a third threshold 326. The coding mode selector 124 is configured to select the HOA mode 330 as the coding mode 152 based on the link budget 150 exceeding the first threshold 322. The coding mode selector 124 is also configured to select the LOA mode 332 as the coding mode 152 based on the link budget 150 exceeding the second threshold 324 and not exceeding the first threshold 322. The coding mode selector 124 is further configured to select the stereo mode 334 based on the link budget 150 not exceeding the second threshold 324. The coding mode selector 124 may select the stereo mode 334 as the coding mode 152 further based on the link budget exceeding the third threshold 326, and may select the mono mode 336 as the coding mode 152 based on the link budget 150 not exceeding the third threshold 326.

The multi-mode encoder 128 is dynamically configured, based on the coding mode 152, to encode data according to the HOA mode 330, the LOA mode 332, the stereo mode 334, or the mono mode 336. Examples of dynamic switching between coding modes are described in further detail with reference to FIG. 4A and FIG. 4B. In some implementations, the multi-mode encoder 128 is also configured to manage targeted encoding specifications by adjusting encoding factors based on the link budget 150, such as target quality, bitrate, etc., as described in further detail with reference to FIG. 5A and FIG. 5B.

By selecting the coding mode 152 according to the link budget 150, the first device 102 can transmit audio packets to the second device 202 using an encoding format that is adaptable, on a frame-by-frame basis, to substantially maximize spatial resolution and quality of 3D audio that is transmitted to the second device 202 without exceeding a transmission capacity of the communication link 172. As a result, a playback experience at the second device 202 may be substantially improved as compared to a system that does not dynamically adjust to variations in the communication link 172.

Although the coding mode selector 124 is illustrated as selecting the coding mode 152 based on the link budget 150, it should be understood that in other implementations the coding mode selector 124 may select the coding mode 152 based on one or more metrics associated with, or computed based on, the link data 168 without determining the link budget 150. Although the coding mode selector 124 is illustrated as selecting between four coding modes based on three thresholds, in other implementations the coding mode selector 124 selects from fewer than four coding modes or more than four coding modes, and may make such selection based on other selection criteria, such as using a different number of thresholds, an output of one or more lookup tables, computations, or other selection mechanism, or any combination thereof.

Figure 4A:
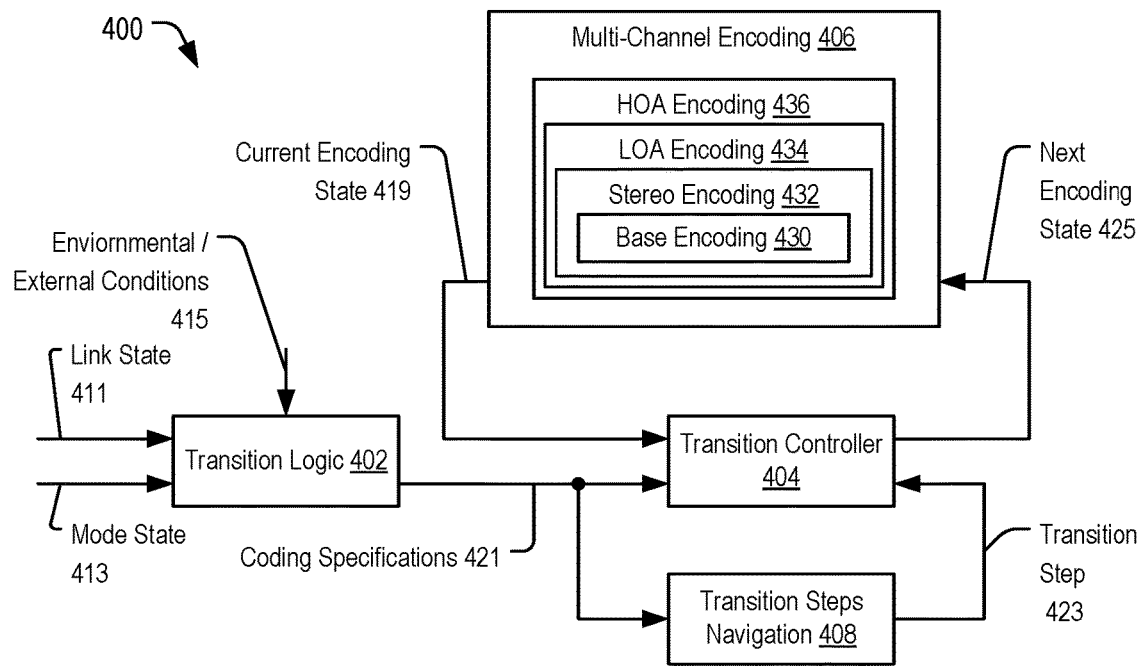
FIG. 4A is a block diagram of an illustrative aspect of components of a system operable to perform dynamic mode switching to encode audio, in accordance with some examples of the present disclosure.
Figure 4B:
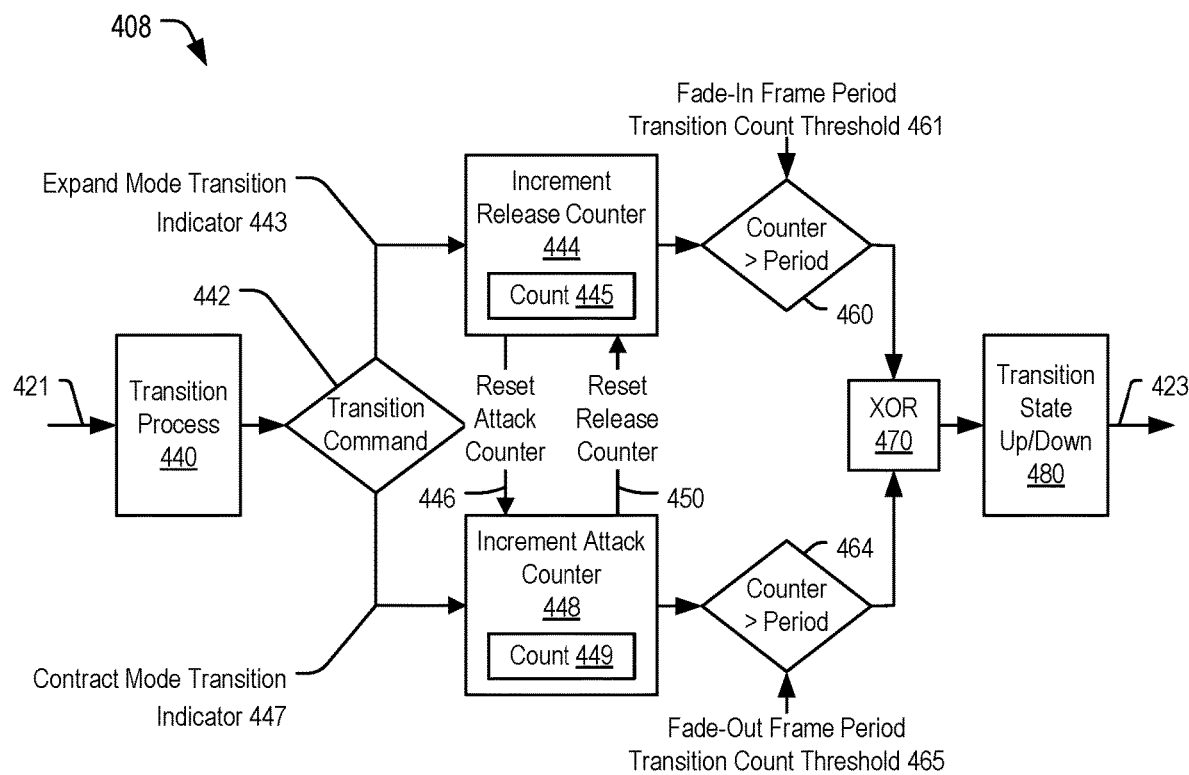
FIG. 4B is a block diagram of an illustrative aspect of components of the system of FIG. 4A, in accordance with some examples of the present disclosure.
Figure 5A:
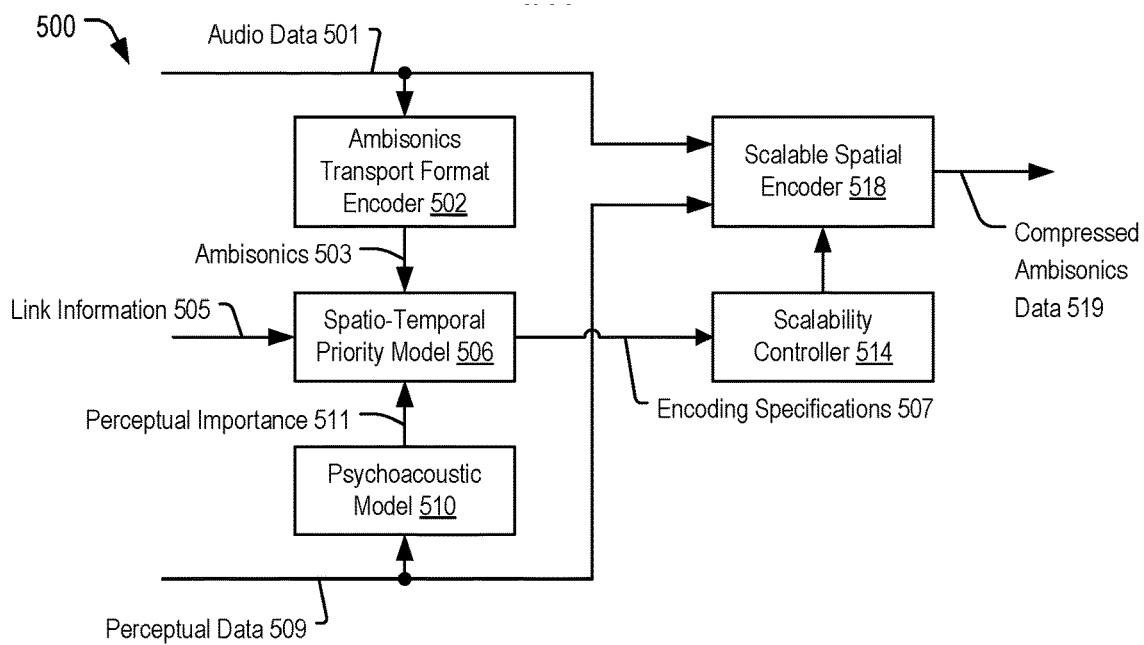
FIG. 5A is a block diagram of an illustrative aspect of a scalability control component of a system operable to perform audio encoding based on link information, in accordance with some examples of the present disclosure.
Figure 5B:
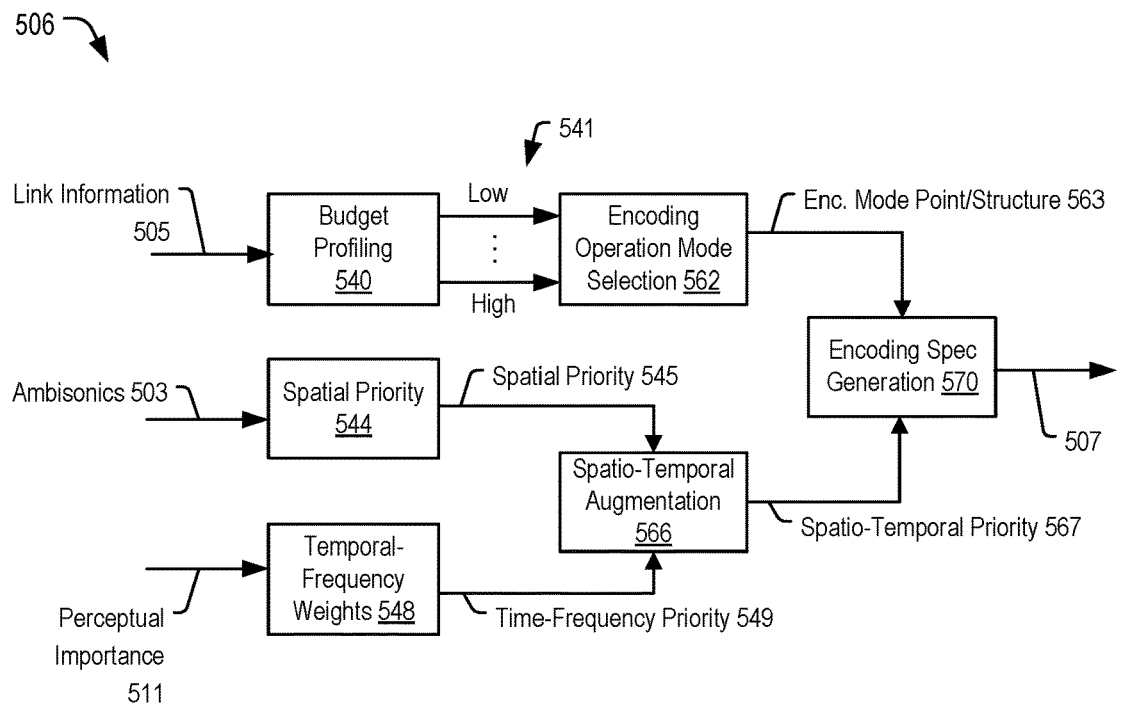
FIG. 5B is a block diagram of an illustrative aspect of components of the spatio-temporal priority model of FIG. 5A, in accordance with some examples of the present disclosure.

According to various implementations, the multi-mode encoder 128 is configured to perform a data compression process that accommodates requests triggered by the link data 168, the link budget 150, link margin, signal strength, spatial information (e.g., based on a beamforming operation to locate an audio source), motion, link quality, one or more other factors that are external to the multi-mode encoder 128, or any combination thereof. FIGS. 4A and 4B illustrate details of adaptively controlling the data compression process performed by the multi-mode encoder 128 by dynamically switching between multiple coding modes having particular quality, bitrate, latency, and channel features. FIGS. 5A and 5B illustrate details of adaptively controlling the data compression process performed by the multi-mode encoder 128 by dynamically adapting components in response to variations in such codec-external parameters.

Referring to FIG. 4A, an illustrative example of components and operations that may be used to perform dynamic mode switching to encode audio is illustrated and generally designated 400. Transition logic 402 is configured to receive a link state 411 (e.g., based on the link data 168 or the link budget 150), a mode state 413 (e.g., format of the audio data to be encoded, such as surround sound format, an ambisonics format, and object-based spatial audio format, etc.), and one or more additional environmental or external conditions 415 (e.g., transmission range, network strength, etc.). The transition logic 402 is configured to output coding specifications 421 that are provided to a transition controller 404 and to a transition steps navigation component 408. The transition steps navigation component 408 is configured to generate an output indicating a transition step 423 to the transition controller 404. The transition controller 404 is configured to determine a next encoding state 425 based on a current encoding state 419, the coding specifications 421, and the transition step 423. In a particular implementation, the transition logic 402, the transition steps navigation component 408, and the transition controller 404 are included in the coding mode selector 124, the multi-mode encoder 128, or a combination thereof.

A graphical depiction of multi-channel encoding 406 illustrates multiple nested encoding modes based on a size of output audio data encoded based on each of the encoding modes. HOA encoding 436 has a largest size, LOA encoding 434 has a smaller size than the HOA encoding 436, stereo encoding 432 has a smaller size than the LOA encoding 434, and base encoding 430 has a smallest size. For example, the HOA encoding 436 may correspond to selection of the HOA mode 330, the LOA encoding 434 may correspond to selection of the LOA mode 332, the stereo encoding 432 may correspond to selection of the stereo mode 334, and the base encoding 430 made correspond to selection of the mono mode 336.

In a particular implementation, to provide a relatively smooth transition between different encoding modes that reduces or eliminates a user-perceivable effect of switching between the encoding modes, the transition controller 404 is configured to transition between encodings in a step-wise process that restricts transitions to either increasing to a next larger encoding size or decreasing to a next smaller encoding size. For example, if the current encoding state 419 is the LOA encoding 434, the transition controller 404 may select the next encoding state 425 to increase to the HOA encoding 436, in response to the link state 411, the mode state 413, the environmental or external conditions 415, or combination thereof, indicating that sufficient additional link capacity is available for communication of audio data encoded using the HOA encoding 436. As another example, if the current encoding state 419 is the LOA encoding 434, the transition controller 404 may select the next encoding state 425 to decrease to the stereo encoding 432 in response to the link state 411, the mode state 413, the environmental or external conditions 415, or combination thereof, indicating reduced link capacity that no longer supports the amount of audio data used by the LOA encoding 434.

The transition steps navigation component 408 is configured to introduce a hysteresis-like delay between encoding mode transitions of the transition controller 404 to prevent repeated switching between two encoding modes due to communication link conditions being near a transition boundary between the two encoding modes. For example, when the link budget 150 of FIG. 3 is approximately equal to the second threshold 324, the transition steps navigation component 408 prevents "ping-ponging" between the stereo mode 334 and the LOA mode 332 due to spurious variations of the link budget 150 above and below the second threshold 324. A particular implementation of the transition steps navigation component 408 is described further with reference to FIG. 4B.

Although four encoding states are illustrated, in other implementations the transition controller 404 is configured to select from between fewer than four encoding states or more than four encoding states. Although the transition steps navigation component 408 is illustrated as providing the transition step 423 to the transition controller 404, in other implementations the transition steps navigation component 408 is omitted or is incorporated in the transition controller 404.

FIG. 4B depicts a particular implementation of the transition steps navigation component 408, including a transition process logic circuit 440 that is responsive to the coding specifications 421 to generate a transition command 442. The transition command 442 corresponds to either an expand mode transition indicator 443 or a contract mode transition indicator 447. The expand mode transition indicator 443 indicates that conditions are satisfied for a transition of encoding mode to a higher-quality mode (e.g., from the stereo encoding 432 to the LOA encoding 434). The expand mode transition indicator 443 causes an increment release counter circuit 444 to increase the value of a release counter that tracks consecutive expand mode transition indicators 443 and to send a reset attack counter signal 446 that resets an increment attack counter circuit 448. A count 445 (e.g., the value of the release counter) is compared, at a comparator 460, to a period that is associated with a fade-in frame period transition count threshold 461. For example, the fade-in frame period may correspond to a minimum number of frames (e.g., 3 frames) to remain at a particular encoding state before transitioning to a higher-quality encoding state. An output is sent to a detector 470 (e.g., a XOR circuit) in response to the count 445 exceeding the fade-in frame period transition count threshold 461.

Similarly, the contract mode transition indicator 447 indicates that conditions are satisfied for a transition of encoding mode to a lower-quality mode (e.g., from the LOA encoding 434 to the stereo encoding 432). The contract mode transition indicator 447 causes the increment attack counter circuit 448 to increase the value of an attack counter that tracks consecutive contract mode transition indicators 447 and to send a reset release counter signal 450 that resets the increment release counter circuit 444 (e.g., sets the count 445 to zero). A count 449 (e.g., the value of the attack counter) is compared, at a comparator 464, to a period that is associated with a fade-out frame period transition count threshold 465. For example, the fade-out frame period may correspond to a minimum number of frames (e.g., 2 frames) to remain at a particular encoding state before transitioning to a lower-quality encoding state. An output is sent to the detector 470 in response to the count 449 exceeding the fade-out frame period transition count threshold 465.

The detector 470 generates an output in response to either the count 445 exceeding the fade-in frame transition count threshold 461 or the count 449 exceeding the fade-out frame transition count threshold 465. The output of the detector 470 causes a transition state up/down circuit 480 to generate an output indicating the transition step 423.

The transition steps navigation component 408 thus enables the one or more processors 120 of FIG. 2 to select the coding mode 152 at least partially based on whether a count of successive mode transition indicators exceeds a transition count threshold. For example, when a number of successive expand mode transition indicators 443 exceeds the fade-in frame period transition count threshold 461, an output indicating an "up" transition step 423 is generated. As another example, when a number of successive contract mode transition indicators 447 exceeds the fade-out period frame transition count threshold 465, an output indicating a "down" transition step 423 is generated.

By restricting encoding mode transitions based on the frame-in frame period and the fade-out frame period, perceptible changes in audio quality due to multiple successive encoding mode transitions may be reduced or eliminated. In addition, repeated transitions between two encoding modes are eliminated during the fade-in and fade-out frame periods. In some cases, the fade-in frame period can be selected to be longer than the fade-out frame period to allow transitions to a lower-quality encoding mode to occur with less delay than transitions to a higher-quality encoding mode in order to reduce or prevent interruptions in audio data transmission due to rapidly deteriorating communication link conditions.

FIG. 5A illustrates a scalability control component 500 that may be implemented in the multi-mode encoder 128. The scalability control component 500 includes an ambisonics transport format encoder 502 (e.g., an HOA transport format (HTF) encoder), a spatio-temporal priority model 506, a psychoacoustic model 510, a scalability controller 514, and a scalable spatial encoder 518. The ambisonics transport format encoder 502 processes received multi-channel audio data 501 (e.g., HOA data) to generate ambisonics data 503 that includes spatial information regarding foreground and background audio sources represented by the audio data 501. Perceptual data 509 is processed by the psychoacoustic model 510 to generate perceptual importance information 511. The spatio-temporal priority model 506 processes the ambisonics data 503, the perceptual importance information 511, and link information 505 (e.g., the link budget 150) to generate encoding specifications 507. The encoding specifications 507 may target quality, bitrate, etc., as determined by the spatio-temporal priority model 506 with compression effects aimed at enhancing or optimizing perceptual transparency driven by the psychoacoustic model 510.

The encoding specifications 507 are processed at the scalability controller 514 to control the scalable spatial encoder 518. The scalable spatial encoder 518 processes the audio data 501 and the perceptual data 509 to generate compressed ambisonics data 519 (e.g., the encoded audio data 129).

FIG. 5B depicts a particular implementation of operations performed by the spatio-temporal priority model 506. The operations include performing a budget profiling operation 540 operating on the link information 505 to generate a designator 541 of a relative size of the link budget, illustrated as a range of values from a low budget profile value to a high budget profile value. The designator 541 is provided as an input to an encoding operation mode selection operation 562 that generates an encoding mode point/ structure output 563.

The ambisonics data 503 is processed according to a spatial priority operation 544 to determine spatial priority data 545. The perceptual importance information 511 is processed according to a set of temporal-frequency weights 548 to generate time-frequency priority data 549. A spatial-temporal augmentation operation 566 processes the spatial priority data 545 and the time-frequency priority data 549 to generate spatio-temporal priority data 567. The encoding mode point/structure output 563 and the spatio-temporal priority data 567 are processed according to an encoding specification generation operation 570 to generate the encoding specifications 507.

Figure 6A:
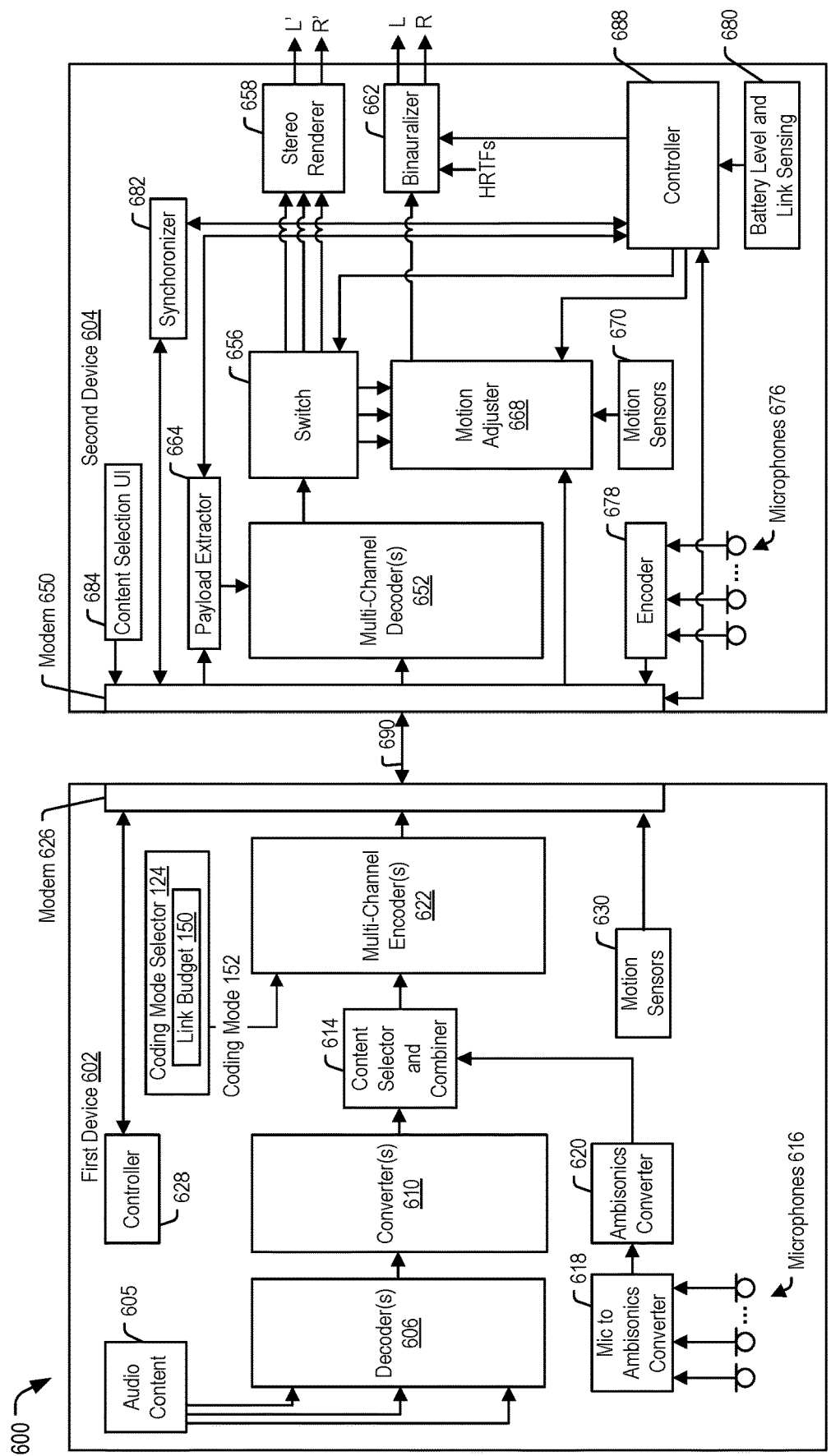
FIG. 6A is a block diagram illustrating another example of an implementation of a system for audio encoding based on link data, in accordance with some examples of the present disclosure.

FIG. 6A depicts a particular implementation of a system 600 including a first device 602 (e.g., an audio encoding and streaming device, such as a handset) in communication with a second device 604 (e.g., a playback device, such as a headset) via a communication link 690 (e.g., a Wi-Fi, 5G, or Bluetooth wireless link). In a particular aspect, the first device 602 corresponds to the first device 102, the second device 604 corresponds to the second device 202, and the communication link 690 corresponds to the communication link 172.

The first device 602 includes one or more decoders 606 configured to receive audio content 605. For example, the audio content 605 may correspond to the audio data 123 from the audio source 122 of FIG. 2. The audio content 605 may include one or more different types of audio content, such as audio content having a multi-channel surround-sound format, an object-based audio format, an ambisonics format, or a combination thereof, as illustrative, non-limiting examples.

The one or more decoders 606 are configured to decode the audio content 605 and provide decoded audio to one or more converters 610. The one or more converters 610 are configured to perform one or more conversions, such as to convert formats of the decoded audio to a common audio format. Audio data output by the one or more converter 610 is received at a content selector and combiner 614.

The content selector and combiner 614 is configured to select audio content corresponding to one or more portions of the audio content 605, audio content input from one or more microphone 616, or a combination thereof. To illustrate, the first device 102 includes one or more microphones 616 configured to capture audio data, such as user-generated content (e.g., speech). Outputs from the one or more microphone 616 are processed by a microphone to ambisonics converter 618 to generate ambisonics audio data. The ambisonics audio data is processed by an ambisonics converter 620 to generate an audio data output having a format that is compatible with the output of the one or more converters 610. The content selector and combiner 614 selects and combines one or more sets of audio data from the one or more converters 610, from the ambisonics converter 620, or both, and outputs the resulting audio data to one or more multi-channel encoders 622.

The one or more multi-channel encoders 622 are configured to perform dynamic mode switching based on the coding mode 152 that is received from the coding mode selector 124 and that is based on the link budget 150. Encoded audio data output by the one or more multi-channel encoders 622 is provided to a modem 626. In a particular implementation, the modem 626 corresponds to the modem 130 of FIG. 2, and the one or more multi-channel encoders 622 correspond to the multi-mode encoder 128.

The first device 602 includes a controller 628 configured to control operation of various components of the first device 602. The first device 602 also includes one or more motion sensors 630, such as an inertial measurement unit (IMU). The one or more motion sensors 630 are configured to provide motion data to the modem 626 for transmission to the second device 604.

The second device 604 includes a modem 650 configured to receive encoded audio data and motion data from the first device 602 via the communication link 690. In a particular implementation, the modem 650 corresponds to the modem 230 of FIG. 2. The second device 604 includes one or more multi-channel decoders 652 configured to receive encoded audio data from the modem 650 and to output decoded audio data to a switch 656.

Audio data received at the switch 656 may be output to a stereo renderer 658 to generate head-tracked stereo output, illustrated as L' and R' output signals. Alternatively, such as when the audio data corresponds to an ambisonics signal, the audio data output from the switch 656 is output to a motion adjuster 668. The motion adjuster 668 is configured to perform one or more rotations to a sound field represented by the audio data, based on motion data received from the first device 602 and further based on motion data detected by one or more motion sensors 670 of the second device 604. For example, in an implementation in which the first device 602 is a handset and the second device 604 is a headset, the motion adjuster 668 subtracts motion detected at the one or more motion sensors 630 of the handset from motion detected at the one or more motion sensors 670 of the headset to determine motion of the headset relative to the handset, such as to determine an orientation change of a user's head (tracked by the second device 604) relative to the user's body (tracked by the first device 602). The motion adjuster 668 outputs motion-adjusted audio data to a binauralizer 662, which applies one or more head related transfer functions (HRTFs) to the motion-adjusted audio data to generate left and right binaural signals, illustrated as L and R output signals.

The second device 604 also includes a payload extractor 664 configured to process packets received via the modem 650 to identify coding information and metadata associated with audio data received from the first device 602. In an example, the payload extractor 664 is configured to identify a channel mode indicator, one or more metadata flags, or a combination thereof, accompanying audio data in a media packet, such as described further with reference to FIGS. 7A-7C. In a particular implementation, the payload extractor 664 is configured to provide channel mode information, metadata extracted from a media packet payload, one or more indicators of metadata embedded in a media packet, one or more other types of information, or a combination thereof, to the one or more multi-channel decoders 652. To illustrate, the payload extractor 664 may be configured to extract, from a received media packet, an indication of whether audio data in the media packet is encoded according to the ambisonics mode 140 or the stereo mode 142 of FIG. 2. The indication of the encoding mode may be used to configure the one or more multi-channel decoders 652 and may also be provided to a controller 688 to control operation of the switch 656, the motion adjuster 668, or one or more other components of the second device 604. To illustrate, based on the indication of the encoding mode, the controller 688 causes audio data encoded according to a stereo mode to be routed to the stereo renderer 658 and causes audio data encoded according to an ambisonics mode to be routed to the motion adjuster 668.

The controller 688 is further configured to receive information regarding battery level and link sensing 680. The controller 688 may be responsive to the battery level, link conditions, or both, to control operations during decoding of received audio data. For example, when a battery level is low (e.g., below a battery level threshold), the controller 688 may cause received audio data to be rendered via the stereo renderer 658, independent of whether the audio data is encoded as ambisonics, to conserve power consumption associated with operation of the motion adjuster 668 and the binauralizer 662.

The second device 604 is also configured to transmit information to the first device 602 via the modem 650. For example, content selections received via a content selection user interface 684 may be transmitted to the first device 602, such as in response to user interactions with content in a virtual reality, extended reality, or augmented reality implementation, or in response to a user selection of a particular portion of the audio content 605, such as the user selecting to pause playback of a music file to participate in a phone conversation or audio conference. As another example, a set of one or more microphones 676 at the second device 604 may capture user speech, ambient sound, or a combination thereof, and provide microphone output signals to an encoder 678. Encoded audio data output by the encoder 678 may be transmitted to the first device 602 via the modem 650 and may be used at the first device 602 for processing, such as in conjunction with execution of a game engine or an audio conferencing application at the first device 602. In some implementations, the encoder 678 operates in a similar manner as the one or more multi-channel encoders 622. To illustrate, in a particular example the second device 604 receives link data from the first device 602 (e.g., as metadata in a media packet or via a link management protocol message), a coding mode selector at the second device 604 determines a coding mode at least partially based on the link budget, and the encoder 678 encodes audio from the one or more microphones 676 based on the selected coding mode (e.g., selected from among a HOA mode, a FOA mode, a stereo mode, or a mono mode based on the strength of the communication link 690).

A synchronizer 682 may be used to synchronize operations associated with the modem 626 of the first device 602 and the modem 650 of the second device 604, such as to align audio frames and other transmissions between the first device 602 and the second device 604 and to synchronize data transfer between components of the second device 604.

Figure 6B:
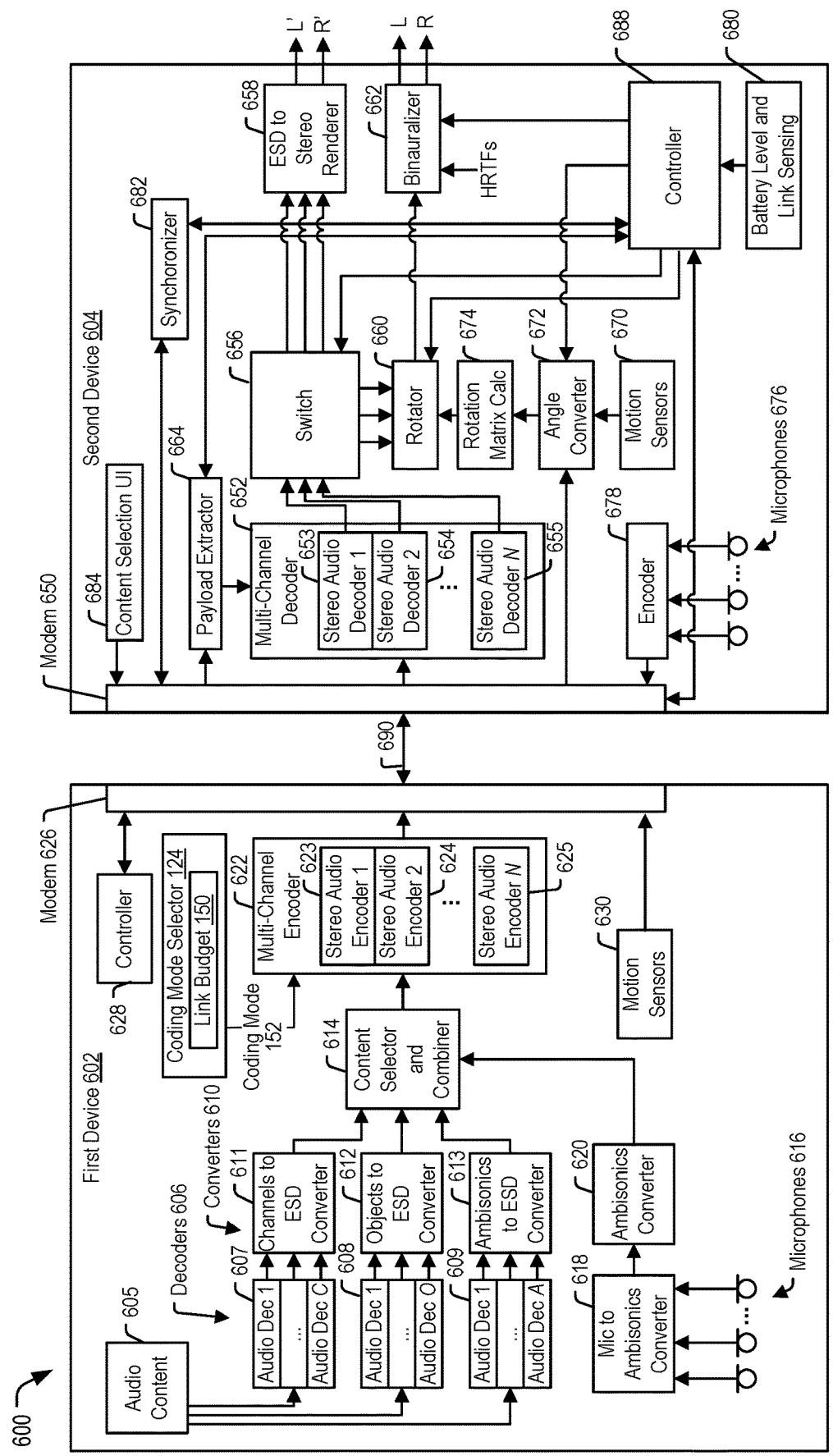
FIG. 6B is a block diagram illustrating another example of an implementation of a system for audio encoding based on link data, in accordance with some examples of the present disclosure.

FIG. 6B depicts a second implementation of the system 600. As illustrated, the one or more decoders 606 of the first device 602 includes a set of audio decoders 607, a set of audio decoders 608, and a set of audio decoders 609. The set of audio decoders 607 is configured to decode audio data that is encoded according to a multi-channel encoding, such as a 5.1 surround sound encoding, and includes C audio decoders (C is an integer greater than one). The set of audio decoders 608 is configured to decode audio data that is encoded according to a multi-channel object-based 3D audio encoding, and includes O audio decoders (O is an integer greater than one). The set of audio decoders 609 is configured to decode audio data that is encoded according to an ambisonics encoding and includes A audio decoders (A is an integer greater than one). The one or more converters 610 includes a channels to equivalent spatial domain (ESD) converter 611, an objects to ESD converter 612, and an ambisonics to ESD converter 613.

The one or more multi-channel encoders 622 includes a first stereo audio encoder 623, a second stereo audio encoder 624, and one or more additional stereo audio encoders including an $N^{th}$ stereo audio encoder 625 (N is an integer greater than one). To illustrate, each of these stereo audio encoders 623-625 is configured to encode a pair of output audio channels from the content selector and combiner 614 for transmission to the second device 604. Thus, a number of stereo audio encoders used by the one or more multi-channel encoders 622 may correspond to one-half of the number of channels output from the content selector and combiner 614. The number of stereo audio encoders 623-625 that are used for audio encoding may be selected based on the number of channels of audio data output by the content selector and combiner 614. For example, a single one of the stereo audio encoders 623-625 may be activated for transmitting two-channel audio data (e.g., encoded according to the stereo mode 142), two of the stereo audio encoders 623-625 may be activated for transmitting a four-channel audio (e.g., encoded according to the LOA mode 332), etc.

At the second device 604, the one or more multi-channel decoders 652 includes a corresponding first stereo audio decoder 653, second stereo audio decoder 654, and one or more additional stereo audio decoders including an $N^{th}$ stereo audio decoder 655. One or more of the stereo audio decoders 653-655 may be selected according to the encoding mode of the received audio data. Each of the stereo audio decoders 653-655, when activated, is configured to output a dual channel audio signal to the switch 656. The stereo audio signals received at the switch 656 may include an ESD representation of audio content and may be output to the stereo renderer (e.g., an ESD to stereo renderer) or to a rotator 660.

The rotator 660, a rotation matrix calculator 674, and an angle converter 672 correspond to the motion adjuster 668 of FIG. 6A. The angle converter 672 processes motion data from the one or more motion sensors 670 and motion data received from the one or more motion sensors 630 of the first device 602 to generate angular coordinates indicating a motion (e.g., change in orientation) of the second device 604 relative to the first device 602. The relative motion determined by the angle converter 672 is used to generate a rotation matrix at the rotation matrix calculator 674. The rotation matrix is provided to the rotator 660, which operates on the audio data to generate a rotated sound field, which is provided to the binauralizer 662 to generate a binauralized output.

Although the first device 602 is illustrated as including the set of audio decoders 607 and the channels to ESD converter 611 for processing multi-channel audio data, in other implementations the set of audio decoders 607 and the channels to ESD converter 611 are omitted. Although the first device 602 is illustrated as including the set of audio decoders 608 and the objects to ESD converter 612 for processing object-based spatial audio data, in other implementations the set of audio decoders 608 and the objects to ESD converter 612 are omitted. Although the first device 602 is illustrated as including the set of audio decoders 609 and the ambisonics to ESD converter 613, in other implementations the set of audio decoders 609 and the ambisonics to ESD converter 613 are omitted. Although the first device 602 is illustrated as including the one or more microphones 616, the microphone to ambisonics converter 618, and the ambisonics converter 620, in other implementations the one or more microphones 616, the microphone to ambisonics converter 618, the ambisonics converter 620, or a combination thereof, are omitted. Although the one or more multi-channel encoders 622 and the one or more multi-channel decoders 652 are illustrated as including stereo audio encoders and stereo audio decoders, respectively, in other implementations one or more other types of multi-channel encoders and decoders are used to generate compressed data for transmission.

Figure 7A:
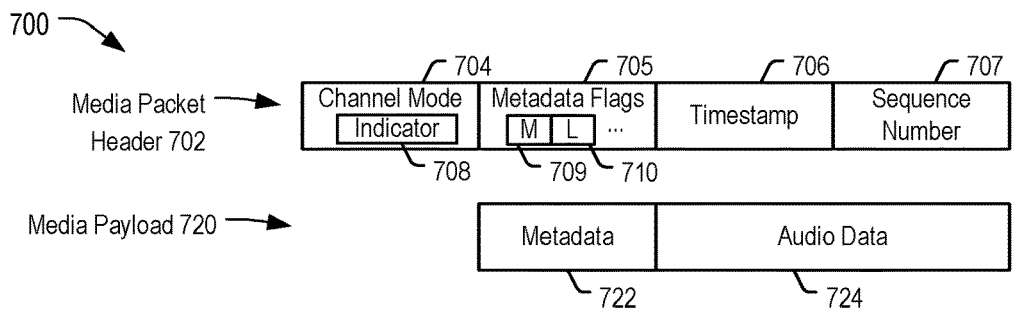
FIG. 7A is a block diagram of an illustrative aspect of a media packet operable to convey link data, in accordance with some examples of the present disclosure.

FIGS. 7A-7D illustrate examples of packet structures and protocol stacks that can be implemented to transmit the link data 168, the encoded audio data 129, or both, via the communication link 172. In FIG. 7A, a media packet 700 includes a media packet header 702 and a media payload 720. The media packet header 702 includes a channel mode field 704, a metadata flags field 705, a timestamp field 706, and a sequence number field 707. The channel mode field 704 can include a channel mode indicator 708. To illustrate, the channel mode indicator 708 can correspond to metadata indicating the coding mode 152 used to encode audio data 724 in the media payload 720. To illustrate, the channel mode indicator 708 can indicate that the audio data 724 corresponds to a mono signal, a left signal, a right signal, stereo data, ambisonic four-channel data, or higher order ambisonic data, as non-limiting, illustrative examples.

The metadata flags field 705 includes one or more metadata flags that indicate the presence of various types of metadata 722 in the media payload 720. For example, a first flag 709 may indicate the presence of motion data in the metadata 722, such as the motion data from the one or more motion sensors 630 that may be sent along with the encoded audio data to the second device 604 of FIG. 6. As another example, a second flag 710 may indicate the presence of link data in the metadata 722, such as the link data 168. One or more additional metadata flags may be included in the metadata flags field 705, such as a third flag to indicate that spatial information (e.g., based on beamforming associated with speech capture at the second device 604) is included in the metadata 722. In some implementations, each of the flags in the metadata flags field 705 is represented as a single bit, and a recipient of the media packet 700 can determine the length of the metadata 722 in the media payload 720 based on the particular bits in the metadata flags field 705 that are set.

Figure 7B:
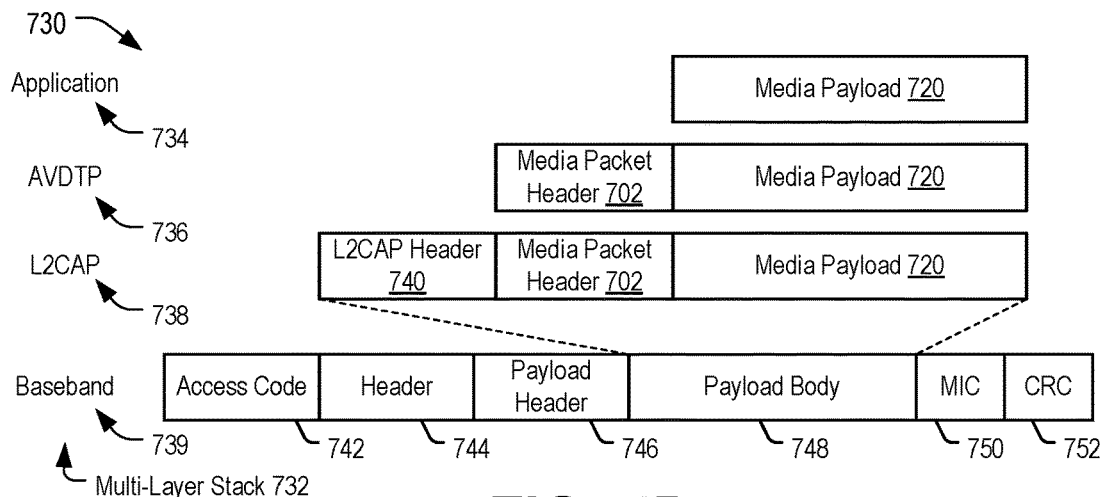
FIG. 7B is a block diagram of an illustrative aspect of the media packet of FIG. 7A in a protocol stack, in accordance with some examples of the present disclosure.
Figure 7C:
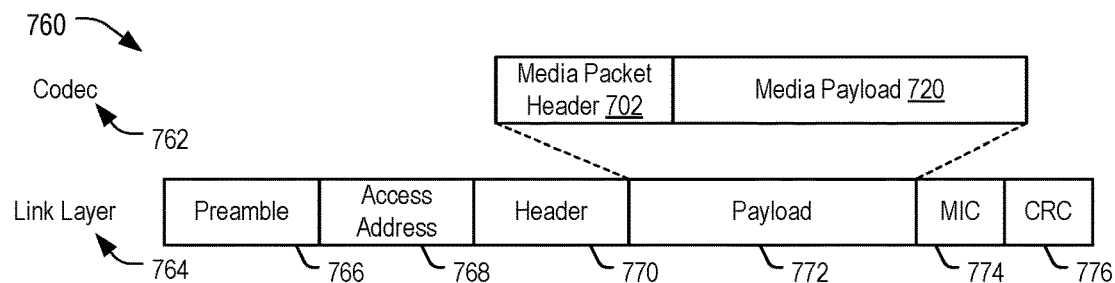
FIG. 7C is a block diagram of another illustrative aspect of the media packet of FIG. 7A in a protocol stack, in accordance with some examples of the present disclosure.
Figure 7D:
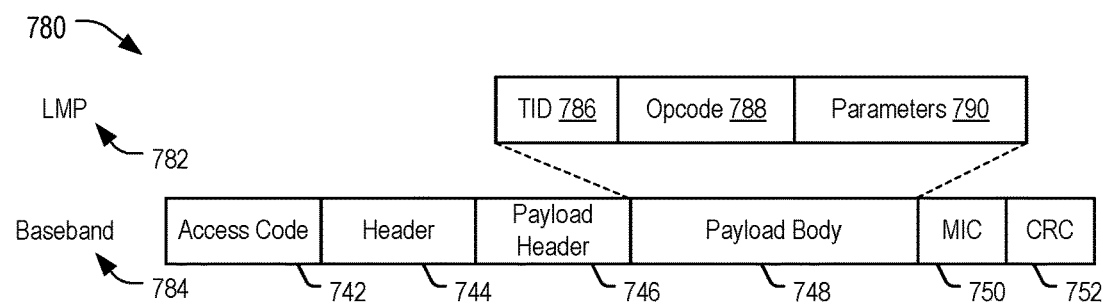
FIG. 7D is a block diagram of an illustrative aspect of a link management packet operable to convey link data, in accordance with some examples of the present disclosure.

FIGS. 7B, 7C, and 7D depict examples of protocol stacks that enable the media packet 700 to be processed at a low level (e.g., a link layer) of a multi-layer software stack. For example, FIG. 7B illustrates an example 730 in which the media payload 720 is generated at an application layer 734. In an audio video distribution transport protocol (AVDTP) layer 736, the media packet header 702 is added to the media payload 720 to generate the media packet 700. At a link layer control access protocol (L2CAP) layer 738, a header 740 is added to the media packet 700 to form a link layer control access protocol packet, which is inserted into a payload body 748 for transport via a baseband layer 739 of a multi-layer stack 732. The payload body 748 is in a packet that also includes an access code field 742, a header 744, a payload header 746 for the payload body 748, an optional message integrity check (MIC) field 750, and a cyclic redundancy check (CRC) field 752. In a particular implementation, the example 730 corresponds to a Bluetooth classic audio implementation.

FIG. 7C illustrates an example 760 with the media packet 700 at a codec 762. The media packet 700 is inserted in a payload 772 of a packet, at a link layer 764, that includes a preamble 766, an access address 768, a header 770, the payload 772, an MIC field 774, and a CRC field 776. In particular implementation, the example 760 corresponds to a Bluetooth low energy (BLE) audio implementation.

In accordance with FIGS. 7B and 7C, the media packet 700 can be sent via unicast, such as a connected isochronous stream (CIS), sent via broadcast, such as broadcast isochronous stream (BIS), or a combination thereof. Alternatively, metadata could be treated as a separate channel and sent on a CIS or BIS of its own. In the case of a CIS, a bidirectional CIS could be used to exchange the data in both directions, allowing flushing of metadata that does not get through in time.

FIG. 7D illustrates an example 780 in which a protocol data unit (PDU) of a link manager protocol (LMP) 782 is used to exchange information between devices, such as between the second device 202 and the first device 102 of FIG. 2. The information can include motion information, link budget, link margin, signal strength, other link data, or spatial information, as illustrative, nonlimiting examples. The link manager protocol 782 PDU can include a transaction identifier (TID) field 786, an opcode 788, and one or more parameters 790 that include the information to be transferred between the devices. The PDU can be embedded in the payload body 748 of a baseband transmission packet that includes an access code field 742, a header 744, a payload header 746, the payload body 748, an optional MIC field, and a CRC field 752, for transmission via a baseband layer 784.

Figure 8A:
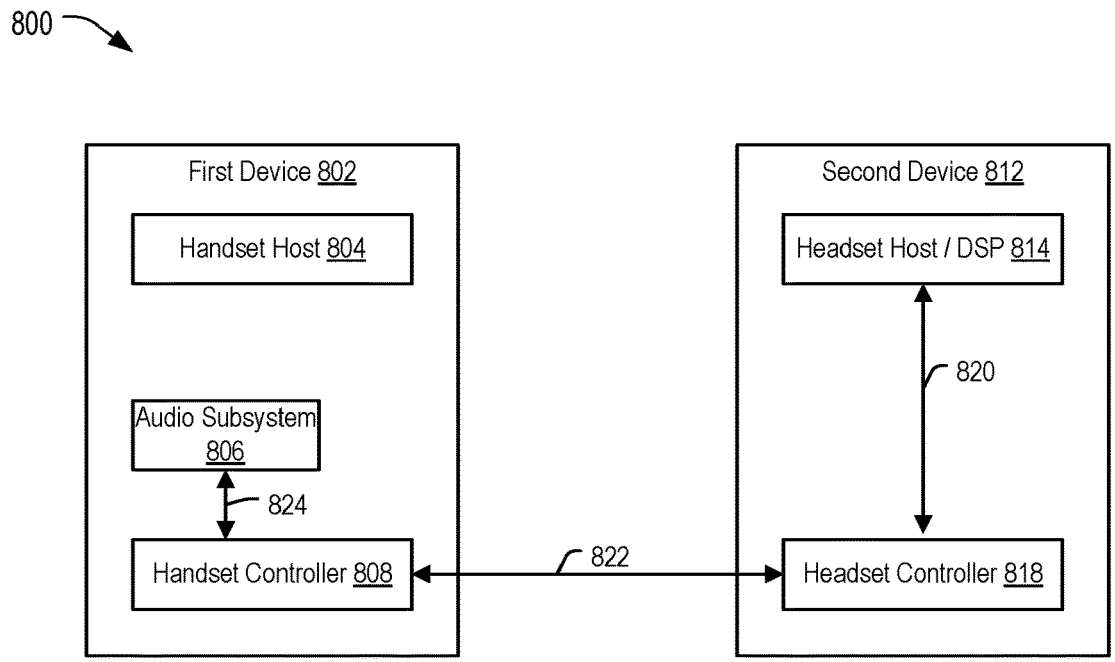
FIG. 8A is a block diagram illustrating another example of an implementation of a system for audio encoding based on link data, in accordance with some examples of the present disclosure.
Figure 8B:
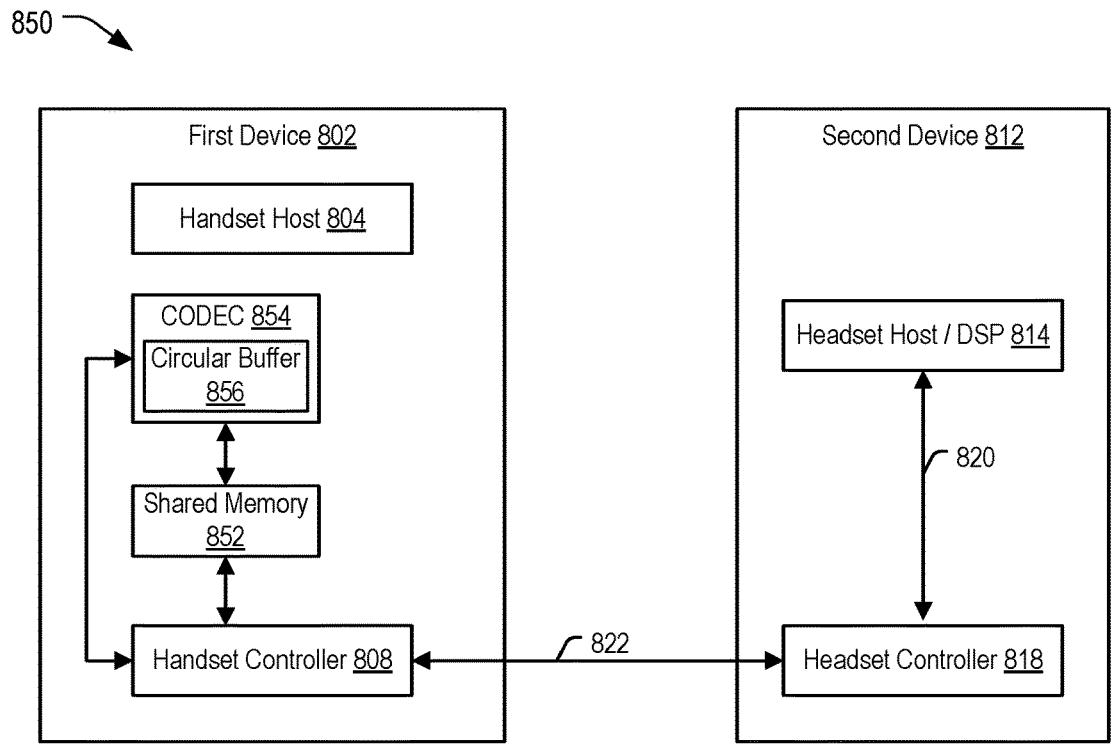
FIG. 8B is a block diagram illustrating another example of an implementation of a system for audio encoding based on link data, in accordance with some examples of the present disclosure.

FIGS. 8A and 8B depict examples of transferring information between a first device 802 and a second device 812 using one or more of the packet structures and protocols of FIG. 7A-7D. In a particular implementation, the first device 802 corresponds to the first device 102 and the second device 812 corresponds to the second device 202 of FIG. 2.

In FIG. 8A, a first example of a system 800 is illustrated in which the first device 802 includes a handset host 804, such as a Bluetooth host, an audio subsystem 806, and a handset controller 808. Components of the first device 802 are graphically illustrated as having a vertical position corresponding to a level of a software stack in which each component operates, with the handset controller 808 at a link layer and the audio subsystem 806 operating at a lower level than the handset host 804, which may operate at an application layer. A dedicated bus 824, such as a serial low-power inter-chip media bus (slimbus), enables the handset controller 808 to send data received from the second device 812, including a channel mode indicator, encoded audio data, link data, other metadata, or a combination thereof, to the audio subsystem 806 for processing. In a particular example, metadata embedded in a media packet (e.g., as in FIGS. 7A-7C) or in an LMP packet (e.g., as in FIG. 7D) is provided to the audio subsystem 806 without having to first be provided to the handset host 804 for processing and subsequently provided from the handset host 804 to the audio subsystem 806. As a result, metadata received at the handset controller 808 is received for processing at the audio subsystem 806 with reduced latency as compared to conventional systems.

The second device 812 includes a headset host/DSP 814 and a headset controller 818. The headset host/DSP 814 is configured to transfer information to the headset controller 818 via one or more commands 820, such as host controller interface (HCI) commands. The one or more commands 820 can include commands regarding motion, link budget, link quality, or spatial information, as illustrative examples. The headset controller 818 is configured to process the one or more commands 820 and generate one or more transmissions 822 to communicate corresponding information to the handset controller 808. For example, the one or more transmissions 822 can include media packets with embedded metadata, link management protocol transmissions, or a combination thereof.

In FIG. 8B, a second example of a system 850 is illustrated in which the first device 802 includes a codec 854 coupled to the handset controller 808 and further includes a shared memory 852 coupled between the codec 854 and the handset controller 808. A circular buffer 856 is included in or coupled to the codec 854. In a particular implementation, the shared memory 852 corresponds to a memory map block that enables the handset controller 808, upon receiving metadata via the one or more transmissions 822 to be processed by the codec 854, to determine (e.g., via address translation) a destination memory address of a location in the circular buffer 856 into which the handset controller 808 writes the metadata. For example, the circular buffer 856 may correspond to dedicated memory that is sized to receive one or more frames of audio data and accompanying metadata, such as the audio data 724 and the metadata 722 from the media payload 720 of FIG. 7A. In a particular implementation, received metadata can be stored by the handset controller 808 into the shared memory 852, such as in one or more dedicated memory locations or registers for link data, motion data, spatial data, etc., that may be periodically or occasionally accessed by the codec 854.

Providing metadata directly to the audio subsystem 806 or codec 854 enables the first device 802 to use the metadata in conjunction with audio data received from the second device 812 and with reduced delay as compared to systems that process received metadata at a host in an upper level of a software stack. For example, latency associated with a transfer of metadata from the handset controller 808 to the handset host 804 can exceed an audio frame boundary and therefore not be available during codec processing of a particular audio frame associated with the metadata. Reducing delay by bypassing the handset host 804 enables the metadata to be available to the audio subsystem 806 or codec 854 during processing of a particular frame associated with the metadata.

Figure 9:
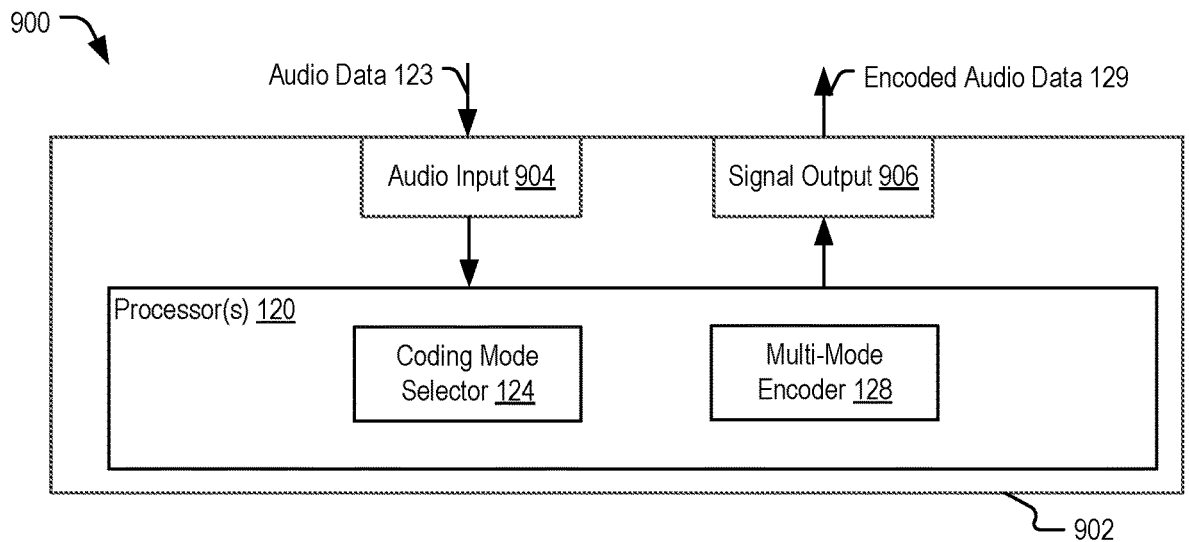
FIG. 9 illustrates an example of an integrated circuit operable to perform audio encoding based on link data, in accordance with some examples of the present disclosure.
Figure 13:
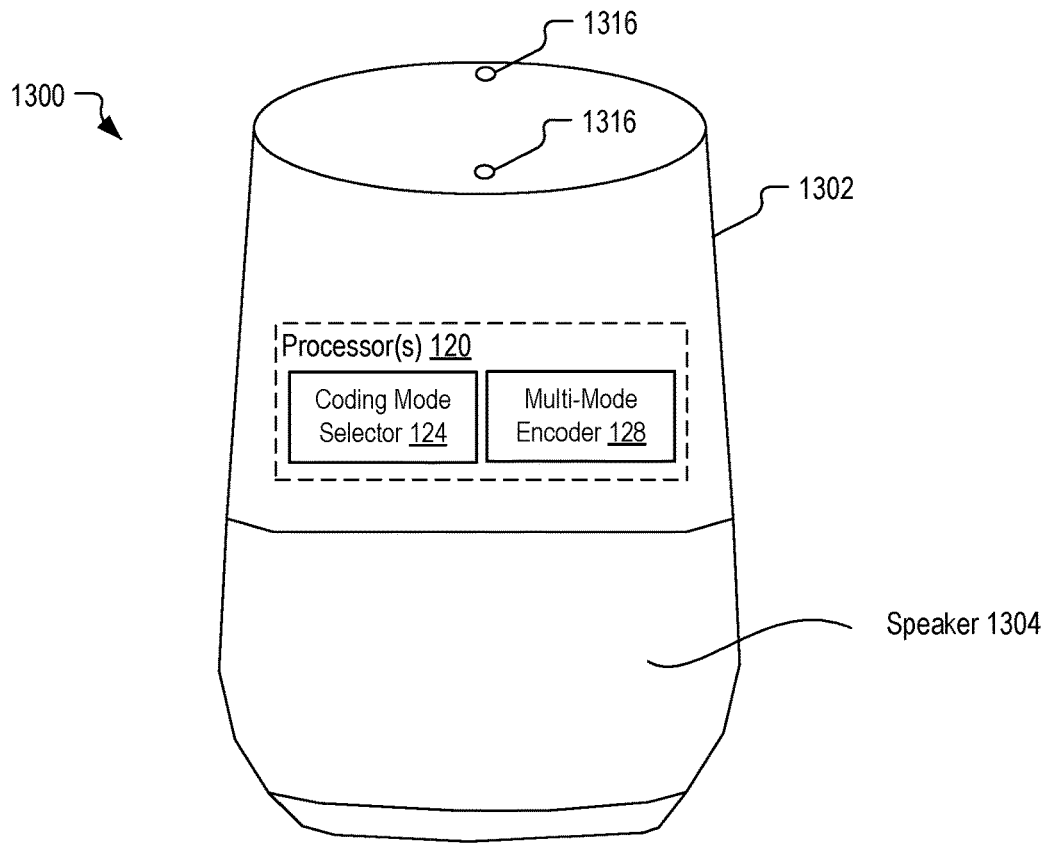
FIG. 13 is a diagram of a voice-controlled speaker system operable to perform audio encoding based on link data, in accordance with some examples of the present disclosure.
Figure 14:
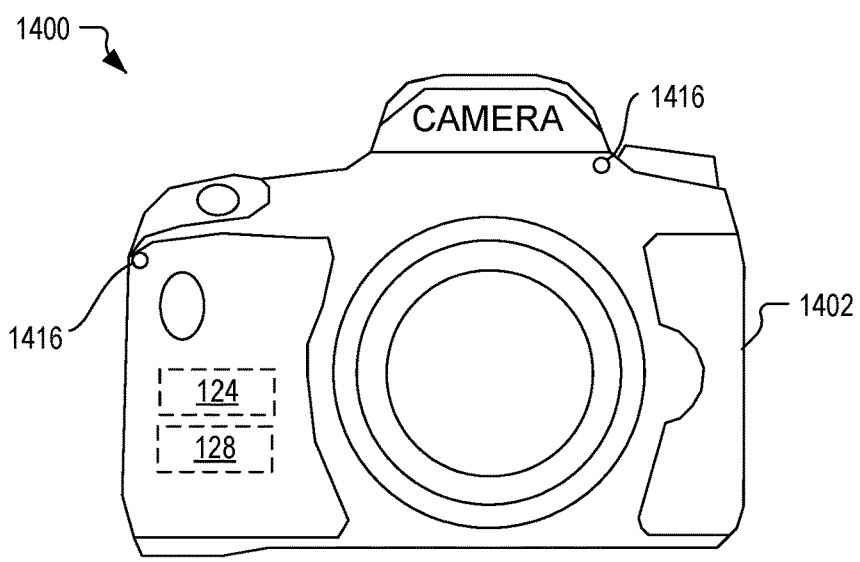
FIG. 14 is a diagram of a camera operable to perform audio encoding based on link data, in accordance with some examples of the present disclosure.
Figure 15:
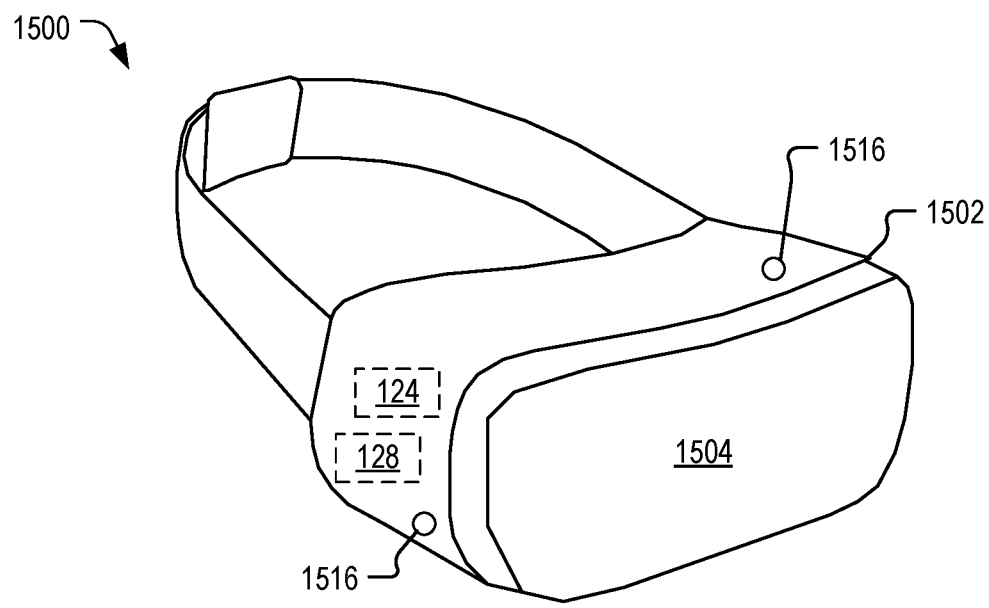
FIG. 15 is a diagram of a headset, such as a virtual reality, mixed reality, or augmented reality headset, operable to perform audio encoding based on link data, in accordance with some examples of the present disclosure.
Figure 16:
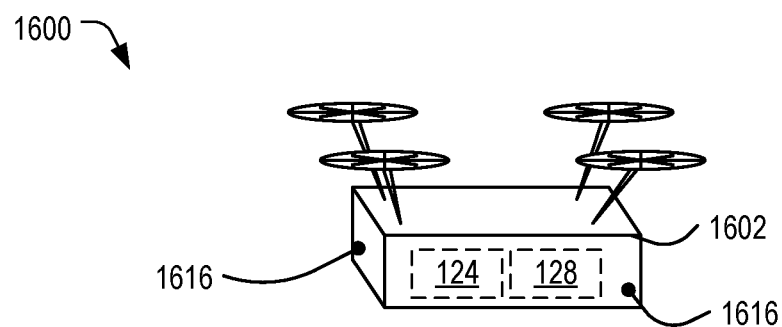
FIG. 16 is a diagram of a first example of a vehicle operable to perform audio encoding based on link data, in accordance with some examples of the present disclosure.
Figure 17:
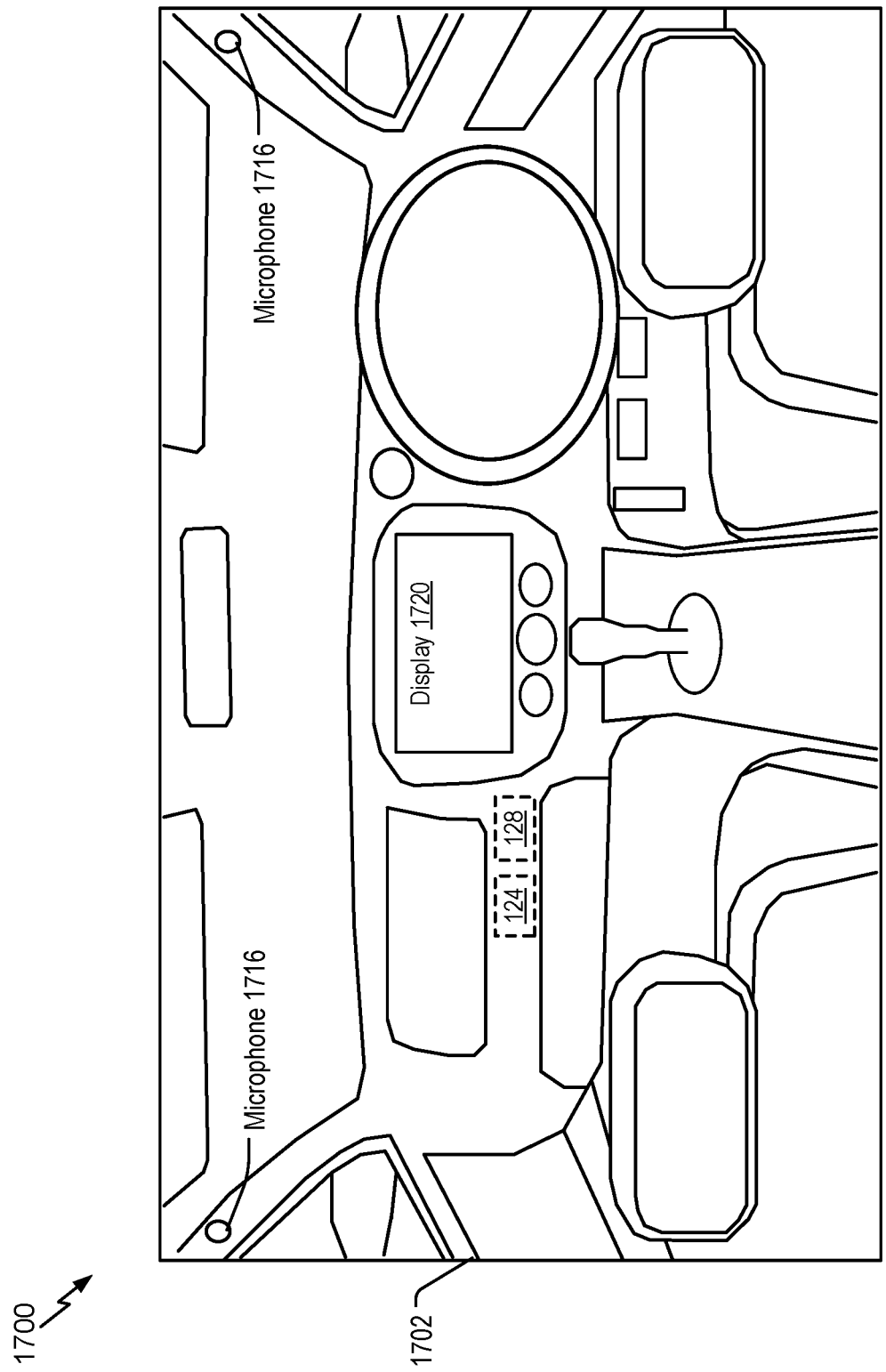
FIG. 17 is a diagram of a second example of a vehicle operable to perform audio encoding based on link data, in accordance with some examples of the present disclosure.

FIG. 9 depicts an implementation 900 of the first device 102 as an integrated circuit 902 that includes the one or more processors 120. The integrated circuit 902 also includes an audio input 904, such as one or more bus interfaces, to enable the audio data 123 to be received for processing. The integrated circuit 902 also includes a signal output 906, such as a bus interface, to enable sending of an output signal, such as the encoded audio data 129. The integrated circuit 902 enables implementation of audio encoding based on link data as a component in a system, such as a mobile phone or tablet as depicted in FIG. 10, a headset as depicted in FIG. 11, a wearable electronic device as depicted in FIG. 12, a voice-controlled speaker system as depicted in FIG. 13, a camera as depicted in FIG. 14, a virtual reality headset, mixed reality headset, or augmented reality headset as depicted in FIG. 15, or a vehicle as depicted in FIG. 16 or FIG. 17.

Figure 10:
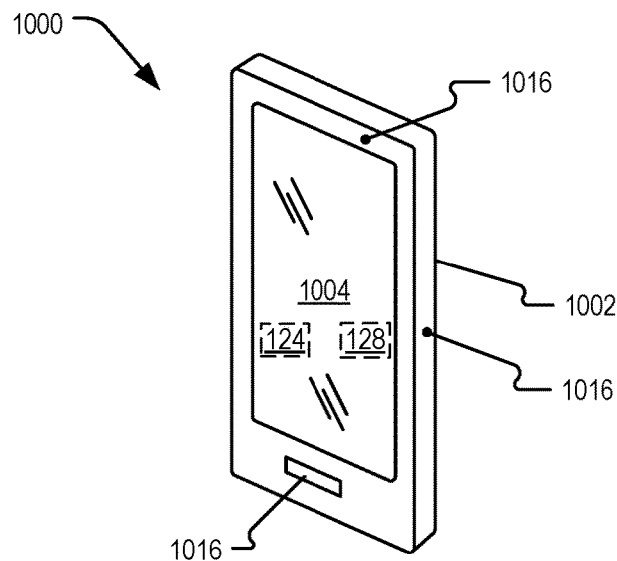
FIG. 10 is a diagram of a mobile device operable to perform audio encoding based on link data, in accordance with some examples of the present disclosure.

FIG. 10 depicts an implementation 1000 in which the first device 102 is a mobile device 1002, such as a phone or tablet, as illustrative, non-limiting examples. The mobile device 1002 includes microphones 1016, such as the microphones 616 of FIG. 6 positioned to capture speech of a user and environmental sounds, and a display screen 1004. Components of the processor 120, including the coding mode selector 124 and the multi-mode encoder 128, are integrated in the mobile device 1002 and are illustrated using dashed lines to indicate internal components that are not generally visible to a user of the mobile device 1002.

Figure 11:
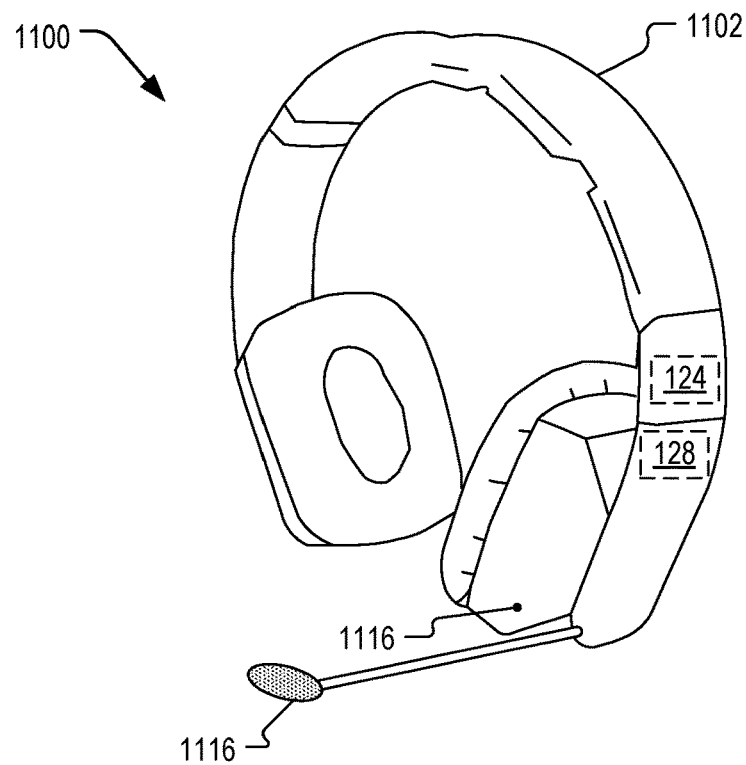
FIG. 11 is a diagram of a headset operable to perform audio encoding based on link data, in accordance with some examples of the present disclosure.

FIG. 11 depicts an implementation 1100 in which components of the processor 120, including the coding mode selector 124 and the multi-mode encoder 128, are integrated in a headset device 1102. The headset device 1102 includes microphones 1116, such as the microphones 616 of FIG. 6, positioned to capture speech of a user and environmental sounds. In a particular example, the coding mode selector 124 is configured to select a coding mode based on link data that is received from a second device (not shown), such as the second device 202 of FIG. 2, and corresponding to a communication link between the headset device 1102 and the second device. The multi-mode encoder 128 is configured to encode audio data captured by the microphones 1116, according to the selected coding mode, for transmission to the second device.

Figure 12:
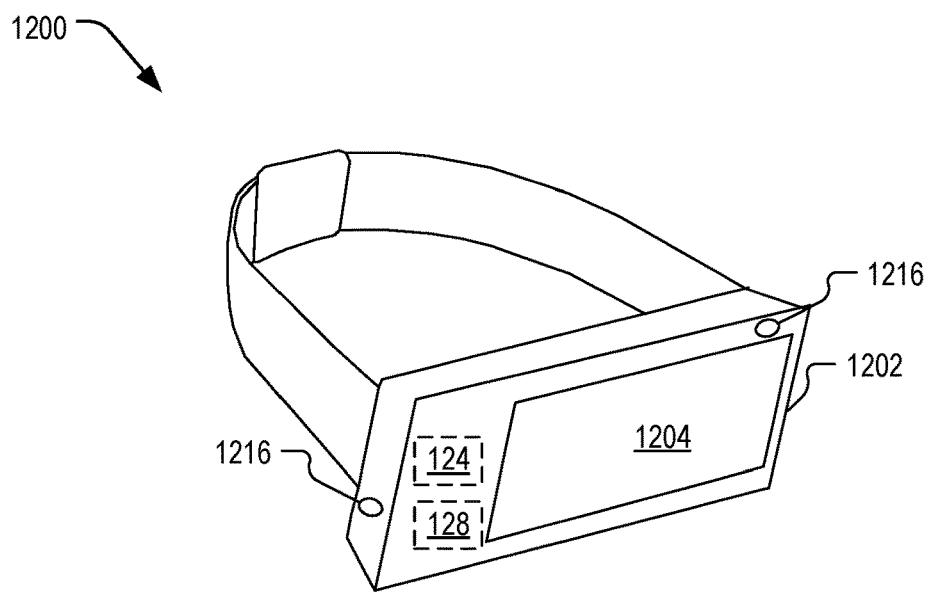
FIG. 12 is a diagram of a wearable electronic device operable to perform audio encoding based on link data, in accordance with some examples of the present disclosure.

FIG. 12 depicts an implementation 1200 in which the first device 102 is a wearable electronic device 1202, illustrated as a "smart watch." The coding mode selector 124 and the multi-mode encoder 128 are integrated into the wearable electronic device 1202. The wearable electronic device 1202 includes microphones 1216, such as the microphones 616 of FIG. 6, positioned to capture sounds such as speech of a user and environmental sounds. In a particular example, the coding mode selector 124 is configured to select a coding mode based on link data that is received from a second device (not shown), such as the second device 202 of FIG. 2, and corresponding to a communication link between the wearable electronic device 1202 and the second device. The multi-mode encoder 128 is configured to encode audio data captured by the microphones 1216, according to the selected coding mode, for transmission to the second device. In a particular example, a user of the wearable electronic device 1202 may participate in a conversation with a remote participant, such as via a video conference using the microphones 1216, audio speakers, and a display screen 1204 of the wearable electronic device 1202. In a particular example, the wearable electronic device 1202 includes a haptic device that provides a haptic notification (e.g., vibrates) in response to detection of a low link quality that may impact an audio quality of the conversation. For example, the haptic notification can be initiated based on received link data and can cause a user to relocate or reposition the wearable electronic device 1202 away from sources of interference to improve the quality of the communication link and therefore the audio quality of the conversation.

FIG. 13 is an implementation 1300 in which the first device 102 is a wireless speaker and voice activated device 1302. The wireless speaker and voice activated device 1302 can have wireless network connectivity and is configured to execute an assistant operation. The one or more processors 120, including the coding mode selector 124 and the multi-mode encoder 128, and microphones 1316 (e.g., the microphones 616 of FIG. 6) or a combination thereof, are included in the wireless speaker and voice activated device 1302. The wireless speaker and voice activated device 1302 also includes a speaker 1304. During operation, in response to receiving a verbal command, the wireless speaker and voice activated device 1302 can execute assistant operations, such as via execution of an integrated assistant application at the one or more processors 120. The assistant operations can include adjusting a temperature, playing music, turning on lights, etc. For example, the assistant operations are performed responsive to receiving a command after a keyword or key phrase (e.g., "hello assistant"). In a particular example, the coding mode selector 124 is configured to select an audio encoding mode based on link data that is received from a second device (not shown), such as the second device 202 of FIG. 2, and corresponding to a communication link between the wireless speaker and voice activated device 1302 and the second device. The multi-mode encoder 128 is configured to encode audio data captured by the microphones 1316, according to the selected coding mode, for transmission to the second device.

FIG. 14 depicts an implementation 1400 in which the first device 102 is a portable electronic device that corresponds to a camera device 1402. The camera device 1402 includes the coding mode selector 124, the multi-mode encoder 128, and microphones 1416 (e.g., the microphones 616 of FIG. 6) or a combination thereof. In a particular example, the coding mode selector 124 is configured to select an audio encoding mode based on link data that is received from a second device (not shown), such as the second device 202 of FIG. 2, and corresponding to a communication link between the camera device 1402 and the second device. The multi-mode encoder 128 is configured to encode audio data captured by the microphones 1416, according to the selected coding mode, for transmission to the second device.

FIG. 15 depicts an implementation 1500 in which the first device 102 includes a portable electronic device that corresponds to an extended reality ("XR") headset 1502, such as a virtual reality ("VR"), augmented reality ("AR"), or mixed reality ("MR") headset device. The coding mode selector 124 and the multi-mode encoder 128, microphones 1516 (e.g., the microphones 616 of FIG. 6), or a combination thereof, are integrated into the headset 1502. A visual interface device 1504 is positioned in front of the user's eyes to enable display of augmented reality or virtual reality images or scenes to the user while the headset 1502 is worn. In a particular example, the coding mode selector 124 is configured to select an audio encoding mode based on link data that is received from a second device (not shown), such as the second device 202 of FIG. 2, and corresponding to a communication link between the headset 1502 and the second device. The multi-mode encoder 128 is configured to encode audio data captured by the microphones 1516, according to the selected coding mode, for transmission to the second device. In a particular example, a user of the headset 1502 may participate in a conversation with a remote participant, such as via a video conference using the microphones 1516, audio speakers, and the visual interface device 1504.

FIG. 16 depicts an implementation 1600 in which the first device 102 corresponds to or is integrated within a vehicle 1602, illustrated as a manned or unmanned aerial device (e.g., a package delivery drone). The coding mode selector 124 and the multi-mode encoder 128, microphones 1616 (e.g., the microphones 616 of FIG. 6), or a combination thereof, are integrated into the vehicle 1602. In a particular example, the coding mode selector 124 is configured to select an audio encoding mode based on link data that is received from a second device (e.g., a base station of a 5G wireless network, not shown) and corresponding to a communication link between the vehicle 1602 and the second device. The multi-mode encoder 128 is configured to encode audio data captured by the microphones 1616, such as environmental sounds and spoken delivery instructions from an authorized user of the vehicle 1602, according to the selected coding mode for transmission to the second device.

FIG. 17 depicts another implementation 1700 in which the first device 102 corresponds to, or is integrated within, a vehicle 1702, illustrated as a car. The vehicle 1702 includes the processor 120 including the coding mode selector 124 and the multi-mode encoder 128. The vehicle 1702 also includes microphones 1716 and a display 1720. In a particular example, the coding mode selector 124 is configured to select an audio encoding mode based on link data that is received from a second device (e.g., a base station of a 5G wireless network, not shown, or another vehicle that is in wireless communication with the vehicle 1702) and corresponding to a communication link between the vehicle 1702 and the second device. The multi-mode encoder 128 is configured to encode audio data captured by the microphones 1716, such as interior sounds, speech of an operator of the vehicle 1702, speech of one or more passengers in the vehicle 1702, or a combination thereof, according to the selected coding mode for transmission to the second device.

Figure 18:
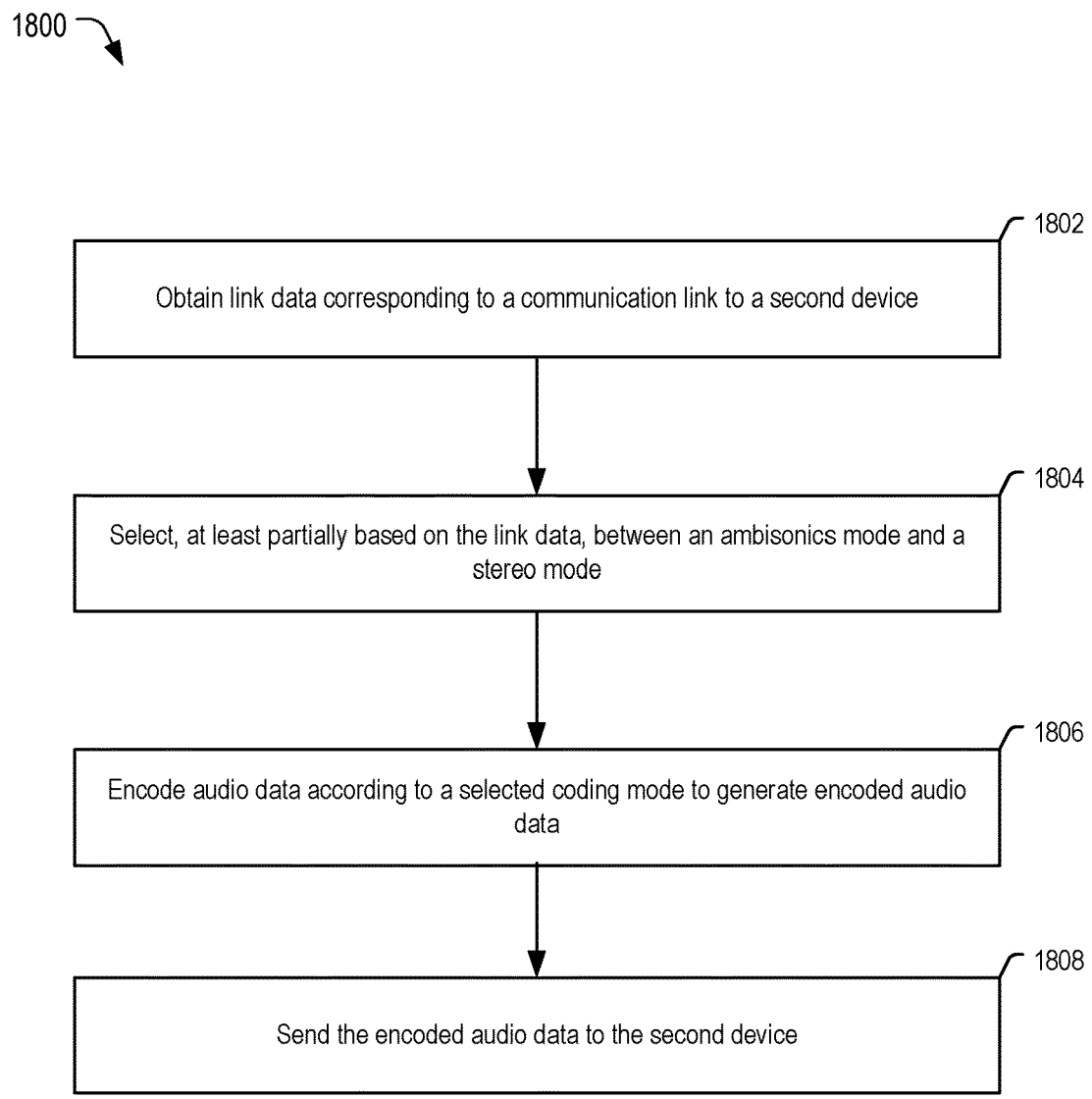
FIG. 18 illustrates an example of a method of audio encoding based on link data.

FIG. 18 illustrates an example of a method 1800 of audio encoding based on link data. The method 1800 may be performed by an electronic device, such as the first device 102, the first device 602, the second device 604, or the second device 812, as illustrative, non-limiting examples.

The method 1800 includes obtaining, at one or more processors, link data corresponding to a communication link to a second device, at block 1802. For example, in FIG. 2, the one or more processors 120 of the first device 102 receive the link data 168 from the second device 202. In a particular example, the link data corresponds to a link budget, such as the link budget 150.

The method 1800 includes selecting, at the one or more processors and at least partially based on the link data, between an ambisonics mode and a stereo mode, at block 1804. As an example, the one or more processors 120 of FIG. 2 determine the link budget 150 based on the link data, and the link budget 150 is used to select between the ambisonics mode 140 and the stereo mode 142. As another example, the link budget calculator 302 of FIG. 3 determines the link budget 150 based on the link data 168, and the coding mode selector 124 selects the HOA mode 330, the LOA mode 332, the stereo mode 334, or the mono mode 336 based on comparing the link budget 150 to one or more of the thresholds 322, 324, 326. In some implementations, the selecting is further based on whether a count of successive mode transition indicators exceeds a transition count threshold, such as whether the count 445 of expand mode transition indicators 443 exceeds the fade-in frame period transition count threshold 461 of FIG. 4B, or whether the count 449 of contract mode transition indicators 447 exceeds the fade-out frame period transition count threshold 465, as illustrative, non-limiting examples.

In some implementations, the method 1800 includes encoding audio data according to a selected coding mode to generate encoded audio data, at block 1806. For example, the first device 102 encodes the audio data 123 at the multi-mode encoder 128 according to the coding mode 152 to generate the encoded audio data 129. In some implementations, the method 1800 includes, based on selection of the ambisonics mode, compressing ambisonics data based on a spatio-temporal priority model to generate compressed ambisonics data for transmission, such as described with reference to the spatio-temporal priority model 506 of FIGS. 5A and 5B.

In some implementations, the method 1800 includes sending the encoded audio data to the second device, at block 1808. In an example, the encoded audio data is sent to the second device via a media packet that includes metadata indicating the selected coding mode, such as the channel mode indicator 708, the metadata flags in the metadata flags field 705 (e.g., the second flag 710 indicating the presence of link data), the metadata 722, or a combination thereof, in the media packet 700 of FIG. 7A.

In some implementations, the method 1800 includes receiving a media packet from the second device and, based on the media packet including the link data, extracting the link data from the media packet. As an illustrative example, the first device 602 may receive, from the second device 604, a media packet that includes encoded data from the microphones 676 and link data corresponding to the communication link 690. The first device 602 may extract the link data in a similar manner as described for the payload extractor 664 and provide the link data to the link budget calculator 302 or the coding mode selector 124. In a particular implementation, the media packet is processed at a link layer of a multi-layer software stack, such as described with reference to one or more of FIGS. 7A-7C, 8A, and 8B.

By dynamically adjusting the coding mode based on the link data, audio packets can be transmitted to the second device using an encoding format that is adaptable, such as on a frame-by-frame basis, to substantially maximize spatial resolution and quality of 3D audio that is transmitted to the second device without exceeding a transmission capacity of the communication link. As a result, a playback experience at the second device may be substantially improved as compared to a system that does not dynamically adjust to variations in the communication link.

Figure 19:
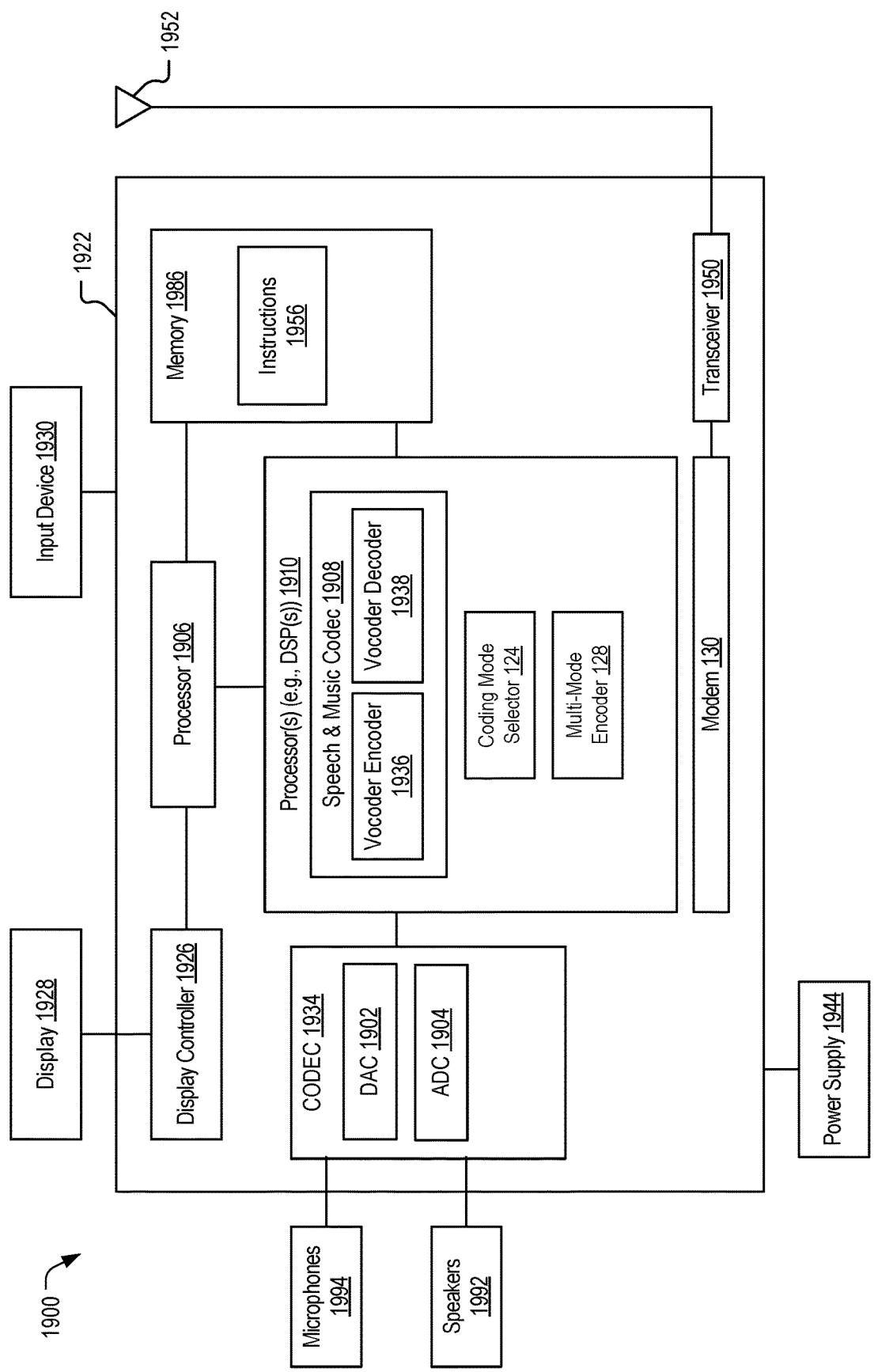
FIG. 19 is a block diagram of a particular illustrative example of a computing device that is operable to perform the techniques described with reference to FIGS. 1-18.

Referring to FIG. 19, a block diagram of a particular illustrative implementation of a device is depicted and generally designated 1900. In various implementations, the device 1900 may have more or fewer components than illustrated in FIG. 19. In an illustrative implementation, the device 1900 may correspond to the first device 102 or the second device 202. In an illustrative implementation, the device 1900 may perform one or more operations described with reference to FIGS. 1-18.

In a particular implementation, the device 1900 includes a processor 1906 (e.g., a central processing unit (CPU)). The device 1900 may include one or more additional processors 1910 (e.g., one or more DSPs). In a particular implementation, the processor 120 of FIG. 2 corresponds to the processor 1906, the processors 1910, or a combination thereof. For example, the processors 1910 may include a speech and music coder-decoder (CODEC) 1908, the coding mode selector 124, the multi-mode encoder 128, or a combination thereof. The speech and music codec 1908 may include a voice coder ("vocoder") encoder 1936, a vocoder decoder 1938, or both.

The device 1900 may include a memory 1986 and a CODEC 1934. The memory 1986 may include instructions 1956 that are executable by the one or more additional processors 1910 (or the processor 1906) to implement the functionality described with reference to the coding mode selector 124, the multi-mode encoder 128, or any combination thereof. The device 1900 may include the modem 130 coupled, via a transceiver 1950, to an antenna 1952.

The device 1900 may include a display 1928 coupled to a display controller 1926. One or more speakers 1992 and one or more microphones 1994 may be coupled to the CODEC 1934. The CODEC 1934 may include a digital-to-analog converter (DAC) 1902 and an analog-to-digital converter (ADC) 1904. In a particular implementation, the CODEC 1934 may receive analog signals from the microphone 1994, convert the analog signals to digital signals using the analog-to-digital converter 1904, and send the digital signals to the speech and music codec 1908. In a particular implementation, the speech and music codec 1908 may provide digital signals to the CODEC 1934. The CODEC 1934 may convert the digital signals to analog signals using the digital-to-analog converter 1902 and may provide the analog signals to the speakers 1992.

In a particular implementation, the device 1900 may be included in a system-in-package or system-on-chip device 1922. In a particular implementation, the memory 1986, the processor 1906, the processors 1910, the display controller 1926, the CODEC 1934, and the modem 130 are included in a system-in-package or system-on-chip device 1922. In a particular implementation, an input device 1930 and a power supply 1944 are coupled to the system-on-chip device 1922. Moreover, in a particular implementation, as illustrated in FIG. 19, the display 1928, the input device 1930, the speakers 1992, the microphones 1994, the antenna 1952, and the power supply 1944 are external to the system-on-chip device 1922. In a particular implementation, each of the display 1928, the input device 1930, the speakers 1992, the microphones 1994, the antenna 1952, and the power supply 1944 may be coupled to a component of the system-on-chip device 1922, such as an interface or a controller.

The device 1900 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described techniques, an apparatus includes means for obtaining link data corresponding to a communication link to a second device, such as the modem 130, the coding mode selector 124, the one or more processors 120, the link budget calculator 302, the modem 626, the controller 628, the modem 650, the payload extractor 664, the controller 688, the handset controller 808, the processor 1906, the processor 1910, the transceiver 1950, or a combination thereof.

The first apparatus includes means for selecting, at least partially based on the link data, between an ambisonics mode and a stereo mode, such as the coding mode selector 124, the multi-mode encoder 128, the one or more processors 120, the transition controller 404, the transition steps navigation component 408, the spatio-temporal priority model 506, the scalability controller 514, the scalable spatial encoder 518, the encoder 678, the audio subsystem 806, the codec 854, the processor 1906, the processor 1910, or a combination thereof.

In some implementations, a non-transitory computer-readable medium (e.g., a computer-readable storage device, such as the memory 110 or the memory 1986) includes instructions (e.g., the instructions 112 or the instructions 1956) that, when executed by one or more processors (e.g., the one or more processors 120, the one or more processors 220, the processor 1906, or the one or more processors 1910), cause the one or more processors to perform operations corresponding to at least a portion of any of the techniques or methods described with reference to FIGS. 1-19 or any combination thereof.

Particular aspects of the disclosure are described below in sets of interrelated clauses:

According to Clause 1, a device includes: a memory configured to store instructions; and one or more processors configured to execute the instructions to: obtain link data corresponding to a communication link to a second device; and select, at least partially based on the link data, between an ambisonics mode and a stereo mode.

Clause 2 includes the device of Clause 1, wherein the link data corresponds to a link budget.

Clause 3 includes the device of Clause 2, wherein the one or more processors are configured to: select a higher order ambisonics mode as a coding mode based on the link budget exceeding a first threshold; select a lower order ambisonics mode as the coding mode based on the link budget exceeding a second threshold and not exceeding the first threshold; and select the stereo mode as the coding mode based on the link budget not exceeding the second threshold.

Clause 4 includes the device of Clause 3, wherein the one or more processors are further configured to: select the stereo mode as the coding mode further based on the link budget exceeding a third threshold; and select a mono mode as the coding mode based on the link budget not exceeding the third threshold.

Clause 5 includes the device of any of Clause 1 to Clause 4, wherein the one or more processors are further configured to encode audio data according to the selected ambisonics mode or stereo mode to generate encoded audio data.

Clause 6 includes the device of Clause 5, further including one or more microphones coupled to the one or more processors, the one or more microphones configured to capture the audio data.

Clause 7 includes the device of Clause 5 or Clause 6, further including a modem coupled to the one or more processors, the modem configured to send the encoded audio data to the second device.

Clause 8 includes the device of any of Clause 5 to Clause 7, wherein the encoded audio data is sent to the second device via a media packet that includes metadata indicating a coding mode.

Clause 9 includes the device of Clause 7 or Clause 8, wherein the one or more processors are further configured to: receive a media packet from the second device via the modem; and based on the media packet including the link data, extract the link data from the media packet.

Clause 10 includes the device of Clause 9, wherein the media packet is processed at a link layer of a multi-layer software stack.

Clause 11 includes the device of Clause 9 or Clause 10, wherein the one or more processors are further configured to: extract audio data from the media packet; and provide the audio data and the link data to a shared memory coupled to the one or more processors.

Clause 12 includes the device of any of Clause 1 to Clause 11, wherein selection of a coding mode is further based on whether a count of successive mode transition indicators exceeds a transition count threshold.

Clause 13 includes the device of any of Clause 1 to Clause 12, wherein the one or more processors are further configured to, based on selection of the ambisonics mode, compress ambisonics data based on a spatio-temporal priority model to generate compressed ambisonics data for transmission.

Clause 14 includes the device of any of Clause 1 to Clause 13, wherein the one or more processors are integrated in at least one of a mobile phone. a tablet computer device, or a camera device.

Clause 15 includes the device of any of Clause 1 to Clause 13, wherein the one or more processors are integrated in at least one of a virtual reality headset, a mixed reality headset, or an augmented reality headset.

Clause 16 includes the device of any of Clause 1 to Clause 15, wherein the one or more processors are integrated in a vehicle.

According to Clause 17, a non-transitory computer-readable medium includes instructions that, when executed by one or more processors, cause the one or more processors to: obtain link data corresponding to a communication link to a second device; and select, at least partially based on the link data, between an ambisonics mode and a stereo mode.

Clause 18 includes the non-transitory computer-readable medium of Clause 17, wherein the link data corresponds to a link budget.

Clause 19 includes the non-transitory computer-readable medium of Clause 17 or Clause 18, wherein the instructions, when executed by the one or more processors, further cause the one or more processors to encode audio data according to the selected one of the ambisonics mode and the stereo mode to generate encoded audio data.

According to Clause 20, an apparatus includes: means for obtaining link data corresponding to a communication link to a second device; and means for selecting, at least partially based on the link data, between an ambisonics mode and a stereo mode.

Clause 21 includes the apparatus of Clause 20, wherein the link data corresponds to a link budget.

According to Clause 22, a method includes: obtaining, at one or more processors, link data corresponding to a communication link to a second device; and selecting, at the one or more processors and at least partially based on the link data, between an ambisonics mode and a stereo mode.

Clause 23 includes the method of Clause 22, wherein the link data corresponds to a link budget.

Clause 24 includes the method of Clause 22 or Clause 23, further including encoding audio data according to a selected coding mode to generate encoded audio data.

Clause 25 includes the method of Clause 24, further including receiving the audio data from one or more microphones.

Clause 26 includes the method of Clause 24 or Clause 25, wherein the encoded audio data is sent to the second device via a modem.

Clause 27 includes the method of any of Clause 24 to Clause 26, further including sending the encoded audio data to the second device.

Clause 28 includes the method of any of Clause 24 to Clause 27, wherein the encoded audio data is sent to the second device via a media packet that includes metadata indicating the selected coding mode.

Clause 29 includes the method of any of Clause 22 to Clause 28, further including: receiving a media packet from the second device; and based on the media packet including the link data, extracting the link data from the media packet.

Clause 30 includes the method of Clause 29, wherein the media packet is processed at a link layer of a multi-layer software stack.

Clause 31 includes the method of any of Clause 22 to Clause 30, wherein the selecting is further based on whether a count of successive mode transition indicators exceeds a transition count threshold.

Clause 32 includes the method of any of Clause 22 to Clause 31, further including, based on selection of the ambisonics mode, compressing ambisonics data based on a spatio-temporal priority model to generate compressed ambisonics data for transmission.

Clause 33 includes the method of any of Clause 22 to Clause 32, wherein the selecting between the ambisonics mode and the stereo mode further includes selecting between a higher order ambisonics mode, a lower order ambisonics mode, and the stereo mode.

Clause 34 includes the method of Clause 33, wherein the selecting between the higher order ambisonics mode, the lower order ambisonics mode, and the stereo mode is based on comparisons of the link budget to one or both of a first threshold and a second threshold, wherein the higher order ambisonics mode is associated with the link budget exceeding the first threshold, wherein the lower order ambisonics mode is associated with the link budget exceeding the second threshold and not exceeding the first threshold, and wherein the stereo mode is associated with link budget not exceeding the second threshold.

Clause 35 includes the method of any of Clause 22 to Clause 32, wherein the selecting between the ambisonics mode and the stereo mode further includes selecting between a higher order ambisonics mode, a lower order ambisonics mode, the stereo mode, and a mono mode.

Clause 36 includes the method of Clause 35, wherein the selecting between the higher order ambisonics mode, the lower order ambisonics mode, the stereo mode, and the mono mode is based on comparisons of the link budget to one or more of a first threshold, a second threshold, and a third threshold, wherein the higher order ambisonics mode is associated with the link budget exceeding the first threshold, wherein the lower order ambisonics mode is associated with the link budget exceeding the second threshold and not exceeding the first threshold, wherein the stereo mode is associated with link budget exceeding the third threshold and not exceeding the second threshold, and wherein the mono mode is associated with the link budget not exceeding the third threshold.

Clause 37 includes the method of any of Clause 22 to Clause 36, wherein the one or more processors are integrated in at least one of a mobile phone, a tablet computer device, or a camera device.

Clause 38 includes the method of any of Clause 22 to Clause 36, wherein the one or more processors are integrated in at least one of a virtual reality headset, a mixed reality headset, or an augmented reality headset.

Clause 39 includes the method of any of Clause 22 to Clause 36, wherein the one or more processors are integrated in a vehicle.

According to Clause 40, a device includes: a memory configured to store instructions; and one or more processors configured to execute the instructions to perform the method of any of claims 22 to 39.

According to Clause 41, a non-transitory computer-readable medium includes instructions that, when executed by one or more processors, cause the one or more processors to perform the method of any of claims 22 to 39.

According to Clause 42, an apparatus includes means for carrying out the method of any of claims 22 to 39.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The foregoing techniques may be performed with respect to any number of different contexts and audio ecosystems. A number of example contexts are described below, although the techniques should not be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based on one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, ambisonics audio data format, on-device rendering, consumer audio, TV, and accessories, and car audio systems.

The broadcast recording audio objects, the professional audio systems, and the consumer on-device capture may all code their output using ambisonics audio format. In this way, the audio content may be coded using the ambisonics audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the ambisonics coefficients for playback by one or more of the playback elements. For instance, a user of the mobile device may record (acquire a sound field of) a live event (e.g., a meeting, a conference, a play, a concert, etc.), and code the recording into ambisonics coefficients.

The mobile device may also utilize one or more of the playback elements to playback the ambisonics coded sound field. For instance, the mobile device may decode the ambisonics coded sound field and output a signal to one or more of the playback elements that causes the one or more of the playback elements to recreate the sound field. As one example, the mobile device may utilize the wired and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into ambisonics, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of ambisonics signals. For instance, the one or more DAWs may include ambisonics plugins and/or tools which may be configured to operate with (e.g., work with) one or more game audio systems. In some examples, the game studios may output new stem formats that support ambisonics audio data. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of the Eigen microphone may be located on the surface of a substantially spherical ball with a radius of approximately 4 cm.

Another exemplary audio acquisition context may include a production truck which may be configured to receive a signal from one or more microphones, such as one or more Eigen microphones. The production truck may also include an audio encoder.

The mobile device may also, in some instances, include a plurality of microphones that are collectively configured to record a 3D sound field. In other words, the plurality of microphones may have X, Y, Z diversity. In some examples, the mobile device may include a microphone which may be rotated to provide X, Y, Z diversity with respect to one or more other microphones of the mobile device. The mobile device may also include an audio encoder.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to a decoder via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a renderer to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components. This division of components is for illustration only. In an alternate implementation, a function performed by a particular component may be divided amongst multiple components. Moreover, in an alternate implementation, two or more components may be integrated into a single component or module. Each component may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, circuits, and algorithm steps described in connection with the implementations disclosed herein may be implemented as electronic hardware, computer software executed by a processing device such as a hardware processor, or combinations of both. Various illustrative components, blocks, configurations, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:
1. A device comprising:
a memory configured to store; and
one or more processors configured to:
    obtain link data corresponding to a communication link to a second device, the link data including a received signal strength indicator (RSSI) that is received from the second device, of the communication link;
    generate a link budget based on the link data including the RSSI;
    select, at least partially based on the link budget, between an ambisonics mode and a stereo mode; and
    responsive to the ambisonics mode being selected:
        determine spatial priority data by applying a spatial priority operation on ambisonics data;
        generate spatio-temporal priority data by performing a spatio-temporal augmentation operation on the spatial priority data;

determine encoding properties based on the spatio-temporal priority data, wherein the encoding properties identify compression effects to be applied to encoded audio data; and generate the encoded audio data based on the encoding properties.

2. The device of claim 1, wherein the RSSI corresponds to an Institute of Electrical and Electronic Engineers (IEEE) 802.11 type-network, wherein the IEEE link budget is 2 Mbps or greater.

3. The device of claim 2, wherein the one or more processors are configured to:

detect the link budget has changed to an updated link budget; and select a second mode based on the updated link budget, wherein the second mode corresponds to a higher order ambisonics mode responsive to the updated link budget exceeding a first threshold a lower order ambisonics mode responsive to the updated link budget exceeding a second threshold and not exceeding the first threshold the stereo mode responsive to the link budget exceeding a third threshold and not exceeding the second threshold, or mono mode responsive to the link budget exceeding the third threshold; and generate second encoded audio based on the second mode.

4. The device of claim 3, wherein the one or more processors are further configured to: count a number of consecutive frames that the updated link budget exceeds a particular threshold of a plurality of thresholds, the plurality of thresholds including the first threshold, the second threshold, and the third threshold, wherein the second mode is selected responsive to the number of consecutive frames exceeding a transition count threshold.

5. The device of claim 1, wherein the one or more processors are further configured to generate the ambisonics data by applying an ambisonics transport format encoder to audio data responsive to the ambisonics mode being selected.

6. The device of claim 5, further comprising one or more microphones coupled to the one or more processors, the one or more microphones configured to capture the audio data.

7. The device of claim 1, further comprising a modem coupled to the one or more processors, the modem configured to send the encoded audio data to the second device.

8. The device of claim 7, wherein the one or more processors are further configured to:

receive a media packet from the second device via the modem; and based on the media packet including the link data, extract the link data from the media packet.

9. The device of claim 8, wherein the media packet is processed at a link layer of a multi-layer software stack.

10. The device of claim 8, wherein the one or more processors are further configured to:

extract audio data from the media packet; and provide the audio data and the link data to a shared memory coupled to the one or more processors.

11. The device of claim 1, wherein the link data further includes an estimated distance between the device and the second device, a round trip time corresponding to transmissions between the device and the second device, a transmit power of the second device, or a combination thereof.

12. The device of claim 1, wherein selection of a coding mode is further based on whether a count of successive mode transition indicators exceeds a transition count threshold.

13. The device of claim 1, wherein the one or more processors are further configured to determine a time-frequency priority by applying temporal-frequency weights to perceptual importance data, wherein the perceptual importance data identifies psychoacoustic perception of sound data responsive to the ambisonics mode being selected, and wherein the spatio-temporal priority data is further generated by performing the spatio-temporal augmentation operation on the time-frequency priority.

14. The device of claim 1, wherein the one or more processors are integrated in at least one of a mobile phone, a tablet computer device, or a camera device.

15. The device of claim 1, wherein the one or more processors are integrated in at least one of a virtual reality headset, a mixed reality headset, or an augmented reality headset.

16. The device of claim 1, wherein the one or more processors are integrated in a vehicle.

17. A method comprising:

obtaining, at one or more processors, link data corresponding to a communication link to a second device, the link data including a received signal strength indicator (RSSI) that is received from the second device, of the communication link;

generating a link budget based on the link data including the RSSI;

selecting, at the one or more processors and at least partially based on the link data, between an ambisonics mode and a stereo mode; and responsive to the ambisonics mode being selected:

determining spatial priority data by applying a spatial priority operation on ambisonics data;

generating spatio-temporal priority data by performing a spatio-temporal augmentation operation on the spatial priority data;

determining encoding properties based on the spatio-temporal priority data, wherein the encoding properties identify compression effects to be applied to encoded audio data; and generating the encoded audio data based on the encoding properties.

18. The method of claim 17, wherein the RSSI corresponds to an Institute of Electrical and Electronic Engineers (IEEE) 802.11 type-network, wherein the IEEE link budget is 2 Mbps or greater.

19. The method of claim 17, further comprising generating the ambisonics data by applying an ambisonics transport format encoder to audio data responsive to the ambisonics mode being selected.

20. The method of claim 17, further comprising sending the encoded audio data to the second device.

21. The method of claim 20, wherein the encoded audio data is sent to the second device via a media packet that includes metadata indicating the selected coding mode.

22. The method of claim 17, further comprising:

receiving a media packet from the second device; and based on the media packet including the link data, extracting the link data from the media packet.

23. The method of claim 22, wherein the media packet is processed at a link layer of a multi-layer software stack.

24. The method of claim 17, wherein the selecting is further based on whether a count of successive mode transition indicators exceeds a transition count threshold.

25. The method of claim 17, further comprising:

generating perceptual importance data by applying a psychoacoustic model to perceptual data responsive to the ambisonics mode being selected; and determining a time-frequency priority by applying temporal-frequency weights to the perceptual importance data, wherein the perceptual importance data identifies psychoacoustic perception of sound data responsive to the ambisonics mode being selected, and wherein the spatio-temporal priority data is further generated by performing the spatio-temporal augmentation operation on the time-frequency priority.

26. A non-transitory computer-readable medium comprising instructions that, when executed by one or more processors, cause the one or more processors to:
   obtain link data corresponding to a communication link to a second device, the link data including a received signal strength indicator (RSSI) that is received from the second device, the communication link;
   generate a link budget based on the link data including the RSSI;
   select, at least partially based on the link data, between an ambisonics mode and a stereo mode; and
   responsive to the ambisonics mode being selected:
      determine spatial priority data by applying a spatial priority operation on ambisonics data;
      generate spatio-temporal priority data by performing a spatio-temporal augmentation operation on the spatial priority data;
      determine encoding properties based on the spatio-temporal priority data, wherein the encoding properties identify compression effects to be applied to encoded audio data; and
      generate the encoded audio data based on the encoding properties.

27. The non-transitory computer-readable medium of claim 26, wherein the RSSI corresponds to an Institute of Electrical and Electronic Engineers (IEEE) 802.11 type-network, wherein the IEEE link budget is 2 Mbps or greater.

28. The non-transitory computer-readable medium of claim 26, wherein the instructions, when executed by the one or more processors, further cause the one or more processors to send the encoded audio data to the second device.

29. An apparatus comprising:
   means for obtaining link data corresponding to a communication link to a second device, the link data including a received signal strength indicator (RSSI) that is received from the second device, of the communication link;
   means for generating a link budget based on the link data including the RSSI;
   means for selecting, at least partially based on the link data, between an ambisonics mode and a stereo mode;
   means for determining spatial priority data by applying a spatial priority operation on ambisonics data responsive to the ambisonics mode being selected;
   means for generating spatio-temporal priority data by performing a spatio-temporal augmentation operation on the spatial priority data responsive to the ambisonics mode being selected;
   means for determining encoding properties based on the spatio-temporal priority data responsive to the ambisonics mode being selected, wherein the encoding properties identify compression effects to be applied to encoded audio data; and
   means for generating the encoded audio data based on the encoding properties responsive to the ambisonics mode being selected.

30. The apparatus of claim 29, wherein the RSSI corresponds to an Institute of Electrical and Electronic Engineers (IEEE) 802.11 type-network, wherein the IEEE link budget is 2 Mbps or greater.

* * * * *